US009134919B2

(12) United States Patent
Oh

(10) Patent No.: US 9,134,919 B2
(45) Date of Patent: Sep. 15, 2015

(54) MEMORY DEVICE INCLUDING PRIORITY INFORMATION AND METHOD OF OPERATING THE SAME

(71) Applicant: Samsung Electronics Co., Ltd., Suwon-si (KR)

(72) Inventor: Tae Young Oh, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 250 days.

(21) Appl. No.: 13/837,519

(22) Filed: Mar. 15, 2013

(65) Prior Publication Data

US 2013/0262761 A1 Oct. 3, 2013

Related U.S. Application Data

(60) Provisional application No. 61/617,271, filed on Mar. 29, 2012.

(30) Foreign Application Priority Data

Dec. 13, 2012 (KR) ........................ 10-2012-0145674

(51) Int. Cl.
G06F 13/00 (2006.01)
G06F 3/06 (2006.01)
G06F 13/16 (2006.01)

(52) U.S. Cl.
CPC ............ G06F 3/0659 (2013.01); G06F 3/0689 (2013.01); G06F 13/1626 (2013.01); G06F 13/1642 (2013.01); Y02B 60/1228 (2013.01)

(58) Field of Classification Search
CPC ..... G06F 3/059; G06F 3/0689; G06F 3/1626; G06F 3/1642
USPC .......... 711/150, 154, 158; 710/100, 309, 310, 710/244
See application file for complete search history.

(56) References Cited

U.S. PATENT DOCUMENTS 6,058,461 A 5/2000 Lewchuk et al.
6,122,713 A 9/2000 Huang et al.
7,343,457 B1 * 3/2008 End, III ........................ 711/150
(Continued)

FOREIGN PATENT DOCUMENTS

JP 1999-016388 1/1999
JP 2008-276638 11/2008
(Continued)

OTHER PUBLICATIONS

European Search Report for related application EP 13161227.7 dated May 9, 2014.

Primary Examiner — Reba I Elmore
(74) Attorney, Agent, or Firm — Muir Patent Law, PLLC

(57) ABSTRACT

A memory device and a method of operating the same are provided. The memory device includes a control logic and a memory cell array. The control logic is configured to receive input information including a plurality of commands, a plurality of addresses, and priority information, and to change an execution sequence of the received commands of the input information according to the priority information. The memory cell array is configured to include a plurality of memory cells, and the memory device is configured to perform an operation on one or more memory cells based on the changed execution sequence.

18 Claims, 27 Drawing Sheets

(56) References Cited

U.S. PATENT DOCUMENTS

| | | | |
|---|---|---|---|
| 2003/0005239 A1* | 1/2003 | Dover | 711/150 |
| 2003/0233503 A1* | 12/2003 | Yang et al. | 710/100 |
| 2007/0091696 A1* | 4/2007 | Niggemeier et al. | 365/198 |
| 2011/0276974 A1* | 11/2011 | Chung et al. | 718/103 |
| 2012/0054760 A1* | 3/2012 | Chung | 718/103 |

FOREIGN PATENT DOCUMENTS

| | | |
|---|---|---|
| KR | 2010-0042885 A | 4/2010 |
| KR | 2010-0054734 A | 5/2010 |

* cited by examiner

FIG. 6

Command Queue T1

| command | bank | row | column | priority |
|---|---|---|---|---|
| read | a | m | n | low |
| write | b | k | l | low |
| write | a | m | p | low |
| read | b | k | q | low |
| read | a | s | t | low |
| read | a | s | v | low |
| read | b | y | z | low |
| read | a | w | x | high |

Execution Sequence T2

| command | bank | row | column |
|---|---|---|---|
| active | a | w | |
| active | b | k | |
| read | a | w | x |
| read | b | k | q |
| write | b | k | l |
| Pre-charge | a | | |
| Pre-charge | b | | |
| active | a | m | |
| active | b | y | |
| read | a | m | n |
| read | b | y | z |
| write | a | m | p |
| Pre-charge | a | | |
| Pre-charge | b | | |
| active | a | s | |
| read | a | s | t |
| read | a | s | v |
| Pre-charge | a | | |

FIG. 8

<Priority Table1>

| DT(data_type) | Priority |
|---|---|
| 1 | 4 |
| 2 | 3 |
| 3 | 2 |
| 4 | 1 |

FIG. 10

<Priority Table2>

| TO(time out) | Max. Count |
|---|---|
| 1 | 5 |
| 2 | 20 |
| 3 | 40 |
| 4 | 100 |

MEMORY DEVICE INCLUDING PRIORITY INFORMATION AND METHOD OF OPERATING THE SAME

CROSS-REFERENCE TO RELATED APPLICATIONS

This application claims the priority benefit of U.S. provisional patent application No. 61/617,271 filed on Mar. 29, 2012 and the priority benefit under 35 U.S.C. §119(a) to Korean Patent Application No. 10-2012-0145674 filed on Dec. 13, 2012, the disclosure of each of which is hereby incorporated by reference in their entirety.

BACKGROUND

Various example embodiments relate to a memory device and a method of operating the same, and more particularly, to a memory device for efficient memory access and a method of operating the same.

When a memory device processes commands received from a host, it sequentially processes the commands in order in which the commands are received. In addition, the memory device generates and executes a command auxiliary necessary to process a command received from the host.

In other words, when the memory device receives a read or write command from the host, the memory device generates and executes an active command or a pre-charge command itself to open and close a row in a memory cell array to execute the read or write command. When the memory device executes various commands as described above, the response of the memory device may be delayed a lot in a case where there is a read or write command for which latency is important to the host. As a result, the memory device may not secure fast response and real-time feature required by a system, which may result in the deterioration of the overall performance of the system.

SUMMARY

According to some embodiments, there is provided a memory device comprising a control logic and a memory cell array. The control logic is configured to receive input information including a plurality of commands, a plurality of addresses, and priority information, and to change an execution sequence of the received commands of the input information according to the priority information. The memory cell array includes a plurality of memory cells, the memory device is configured to perform an operation on one or more memory cells based on the execution sequence.

The control logic comprises a packet decoder, a command queue, and an arbiter. The packet decoder is configured to decode the input information received in a packet into the commands, the addresses, and the priority information. The command queue is configured to store the commands, the addresses, and the priority information. The arbiter is configured to change the execution sequence of the commands according to the priority information and to transmit the commands and the addresses to the memory cell array based on the changed execution sequence.

The control logic further comprises a bank state block and a banker controller. The bank state block is configured to store a state of a bank defined in the memory cell array. The bank controller is configured to read or update the state of the bank, which is stored in the bank state block, upon receiving a corresponding command and a corresponding address.

The control logic further comprises a write data queue configured to store write data and to output the write data to the memory cell array when a write command is output to the memory cell array.

The memory device further comprising a first input/output interface configured to receive the commands, the addresses, and the priority information through a first port and to transmit them to the control logic and a second interface configured to receive write data through a second port, to transmit it to the control logic, and to output data read from the memory cell array.

According to further embodiments, there is provided a method for operating a memory device including a memory cell array having a plurality of memory cells. The method comprises receiving, from a host, input information comprising a plurality of commands, a plurality of addresses, data associated with the commands and addresses, and priority information indicating an execution sequence of the commands, changing the execution sequence of the commands based on the priority information and state information of a bank of the memory cell array corresponding to the addresses, and outputting the commands and the addresses to the memory cell array according to the changed execution sequence, wherein the priority information comprises a priority indicator indicating a processing sequence of the commands, a data type of the input information, timeout count information indicating a processing time limit for the commands, a page policy, or an algorithm control signal.

According to other embodiments, there is provided a memory device including a command queue, an arbiter, and a memory cell array. The command queue is configured to store input information including a plurality of commands, a plurality of addresses associated with the commands, and priority information associated with the commands. The arbiter is configured to monitor the stored commands of the command queue, and to change an execution sequence of the stored commands in response to the priority information. The memory cell array includes a plurality of memory cells, and the memory device is configured to perform an operation on the memory cells based on the changed execution sequence.

BRIEF DESCRIPTION OF THE DRAWINGS

The above and other features and advantages of the example embodiments will become more apparent by describing in detail exemplary embodiments thereof with reference to the attached drawings in which:

FIG. 6 is an exemplary diagram showing that a memory device schedules the execution of a plurality of commands received from a host according to some embodiments;

FIG. 8 is an exemplary diagram of a priority table necessary to schedule the execution of a plurality of commands that a memory device receives from a host according to some embodiments;

FIG. 10 is an exemplary diagram of a priority table necessary to schedule the execution of a plurality of commands that a memory device receives from a host according to other embodiments;

DETAILED DESCRIPTION OF THE EMBODIMENTS

Figure 1:
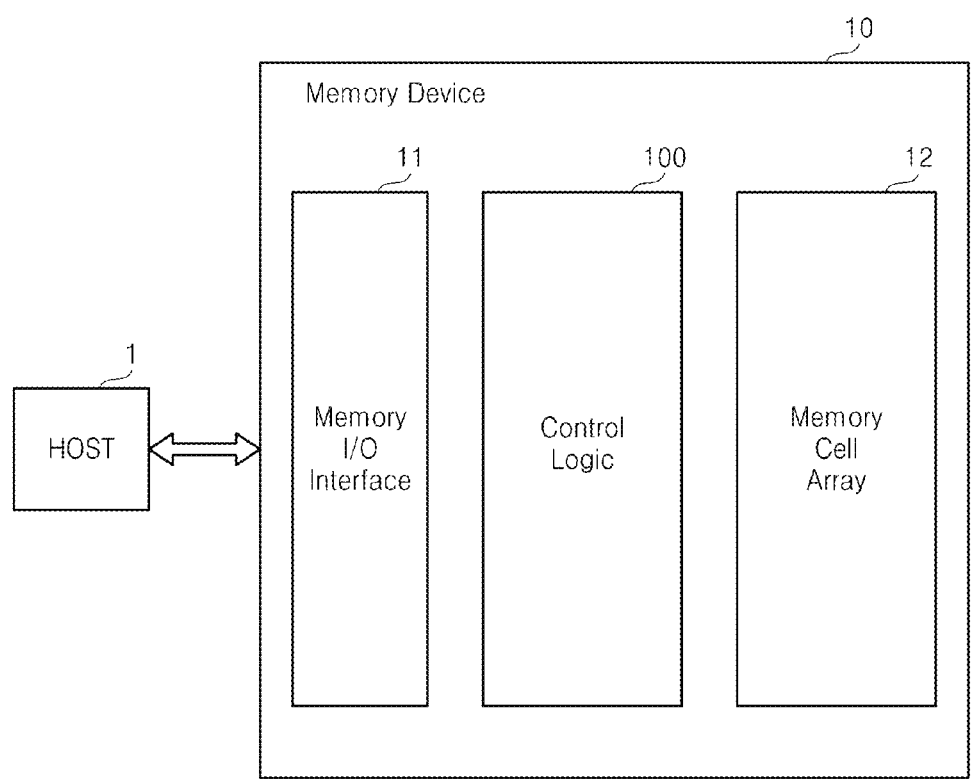
FIG. 1 is a block diagram of a memory device according to some embodiments.

Example embodiments of the present disclosure now will be described more fully hereinafter with reference to the accompanying drawings, in which embodiments of the disclosure are shown. This disclosure may, however, be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms unless the context indicates otherwise. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms such as "comprises," "comprising," "includes," and/or "including," when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a memory device 10 according to some embodiments. The memory device 10 is connected with a host 1. Data may be transferred between the memory device 10 and the host 1 in a packet or through a port including pins.

The host 1 sends input information to the memory device 10. In other words, the host 1 explicitly outputs input information, such as a read request, a write request, or an erase request, to the memory device 10. The host 1 may be implemented as a processing unit which includes a memory controller and a central processing unit (CPU) or a graphics processing unit (GPU). The input information may include a command, an address, and priority information. When the command is a write command, the input information may also include write data. The input information may be transmitted in a packet or may be transmitted through a predetermined port including a plurality of pins.

The memory device 10 may read, write, or erase data according to the input information received from the host 1. The memory device 10 may include a memory input/output (I/O) interface 11, a control logic 100, and a memory cell array 12. The memory I/O interface 11 interfaces the host 1 and the control logic 100 for data communication therebetween. The control logic 100 controls the operations of the memory device 10 including the memory cell array 12.

The memory cell array 12 includes a plurality of memory cells and a periphery circuit. The memory cell array 12 writes data to memory cells, reads the data from the memory cells, and erases the data from the memory cells according to the control of the control logic 100. Each of the memory cells included in the memory cell array 12 may be a volatile memory cell, such as a dynamic random access memory (DRAM) cell, a static RAM (SRAM) cell, a thyrister RAM (T-RAM) cell, a zero-capacitor RAM (Z-RAM) cell, or a twin transistor RAM (TTRAM) cell, or a non-volatile memory cell, such as a magnetic RAM (MRAM) cell, a spin-transfer torque MRAM (STT-MRAM) cell, a resistive memory cell, a phase-change RAM (PRAM) cell, or a flash memory cell. Flash memory including a memory cell array such as the memory cell array 12 may be divided into NOR flash memory and NAND flash memory.

Figure 2:
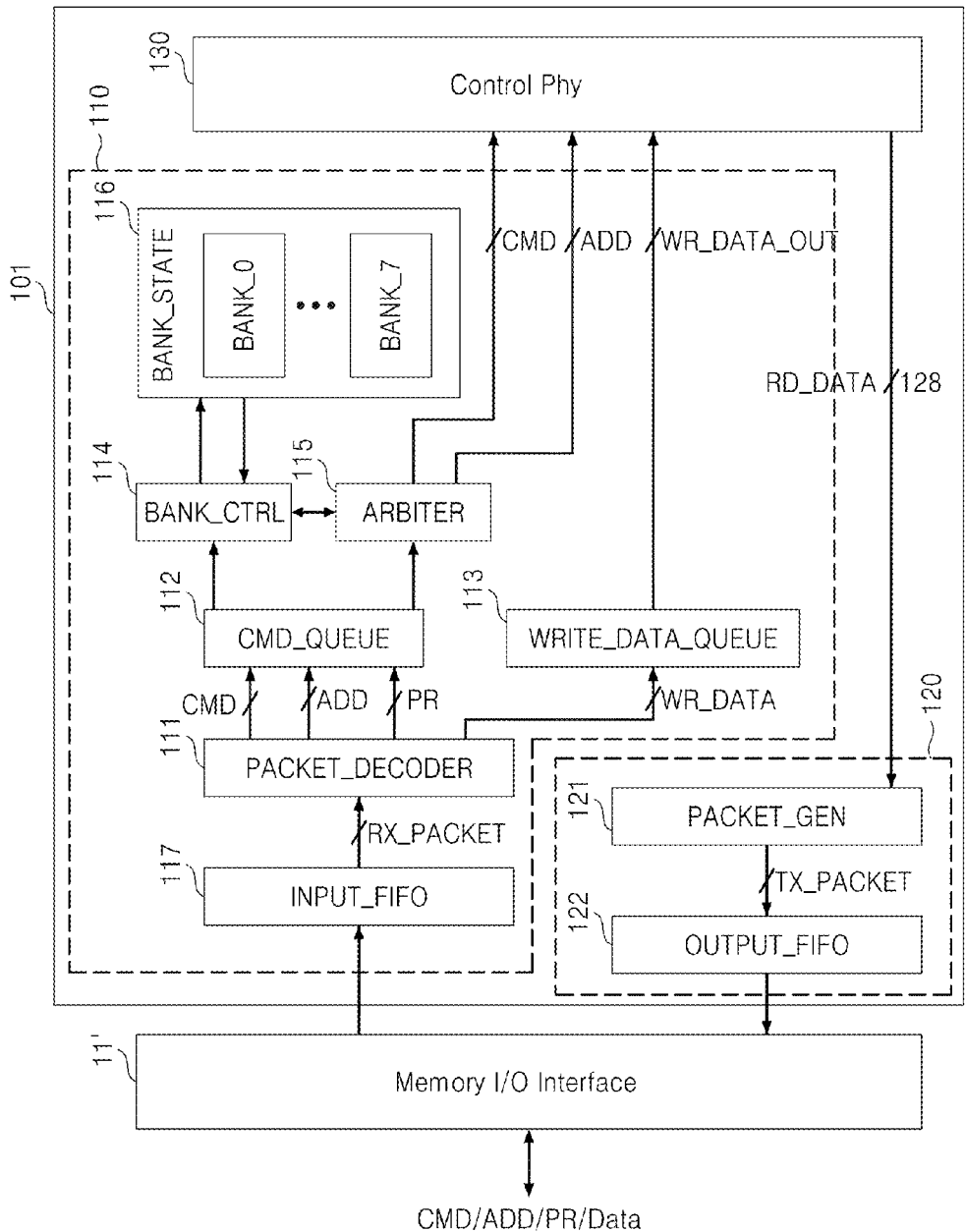
FIG. 2 is a detailed block diagram of an example of the memory device illustrated in FIG. 1, according to one embodiment.

FIG. 2 is a detailed block diagram of an example of the memory device 10 illustrated in FIG. 1, according to one embodiment. Referring to FIG. 2, a control logic 101 may include an input unit 110, an output unit 120, and a control physical layer (PHY) 130.

The input unit 110 checks priority information in input information received from the host 1, changes the execution sequence of commands, and outputs the execution sequence to the memory cell array 12. The priority information of the input information determines priority of command execution. In detail, the priority information may include a priority indicator that determines an execution priority (e.g., sequence) of commands. For example, the priority indicator may be a priority code that specifically designates a priority, may be an indicator of a data type, or may be an indicator of timeout count information. For example, the priority indicator may be transmitted as one or more priority bits that are used to determine the execution priority. If a priority code is used, it may include certain bits specifically correspond to a priority designation. In one example, the certain bits specifically encode a priority value (e.g., 1, 2, 3, etc). In one example, priority bits indicate a data type that can be used to indirectly designate priority. In one example, priority bits indicate a timeout value that is used to indirectly determine priority. In detail, the input unit 110 changes the execution sequence of a write command of data received from the host 1, a read command, and an erase command according to the priority information and the input unit 110 transmits each command to the memory cell array 12 according to the execution sequence. The input unit 110 may include a packet decoder 111, a command queue 112, a write data queue 113, a bank controller 114, an arbiter 115, a bank state block 116, and an input FIFO 117.

The packet decoder 111 decodes input information RX_PACKET received from the host 1. The input information RX_PACKET may include a command CMD to be processed by the memory cell array 12, an address ADD associated with the memory cell array 12, priority information regarding the execution sequence of the command CMD, and write data WR_DATA to be processed. In a case of a read request or an erase request, the packet decoder 111 detects the command CMD and the address ADD from the input information RX_PACKET received from the host 1. In a case of a write request, the packet decoder 111 may put the write data WR_DATA into the write data queue 113. The command queue 112 stores at least one item of input information RX_PACKET that has not yet been processed (or has not yet been output to the memory cell array 12) among a plurality of items of input information RX_PACKET received from the host 1. The command CMD, the address ADD, and the priority information in input information RX_PACKET are stored in the command queue 112. The arbiter 115 may monitor all or some of commands CMD in the command queue 112 to set the execution sequence.

When the input information RX_PACKET includes a write command CMD, a write address ADD, priority information, and write data WR_DATA, the write data queue 113 receives and stores the decoded write data WR_DATA. The write data queue 113 outputs the write data WR_DATA to the memory cell array 12 when the write command CMD is output to the memory cell array 12. In other words, when the write command CMD is transmitted to the memory cell array 12, the write data queue 113 transmits data WR_DATA_OUT to be written to the memory cell array 12 through the control PHY 130.

The bank state block 116 stores a state of each of banks in the memory cell array 12. The bank controller 114 controls an access to the bank state block 116. The bank controller 114 reads a current state of a bank from the bank state block 116, informs the arbiter 115 of the state of the bank, and controls the bank state block 116 to store an update state of the bank when receiving the update state from the arbiter 115.

When the memory cell array 12 includes 8 banks, the arbiter 115 reads a current state of each of banks BANK0 through BANK7 in the memory cell array 12 from the bank state block 116 and considers it when setting the execution sequence of a command to be processed at an address corresponding to each bank. Also, when the arbiter 115 outputs a command to the memory cell array 12, it informs the bank controller 114 of the state of the bank that will be changed by the command so that state information of the bank is updated in the bank state block 116. Although the 8 banks BANK0 through BANK7 are illustrated in FIG. 2 for convenience' sake in the description, the disclosure is not restricted the current embodiments and the number of banks in the memory cell array 12 may be changed. The arbiter 115 changes the execution sequence of commands based on the priority information of commands CMD stored in the command queue 112 and the state of each bank so that commands having higher priority are executed earlier. At this time, the arbiter 115 may additionally generate a command CMD necessary when each of the commands in the command queue 112 is actually executed in the memory cell array 12 and the generated command CMD may be reflected to the changed execution sequence of each command. For instance, in DRAM, a precharge command may be additionally generated to be reflected to a schedule so that a bank is pre-charged after a CAS command. In addition, an active command may be additionally generated and reflected to the schedule so that the bank is activated to allow a closed row including a DRAM cell to be accessed.

The input FIFO 117 sequentially outputs items of input information in order in which they have been received from a memory I/O interface 11'. The output unit 120 includes a packet generation block 121 and an output FIFO 122.

The packet generation block 121 receives data RD_DATA read from the memory cell array 12 in response to, for example, a read command of the host 1 and generates a transmission packet TX_PACKET to transmit the read data RD_DATA to the host 1. The output FIFO 122 outputs transmission packets TX_PACKET to the memory I/O interface 11' in order in which they have been received from the packet generation block 121. The control PHY 130 physically interfaces the control logic 101 with the memory cell array 12 to transmit diverse data for controlling the operation of the memory cell array 12. In detail, the control PHY 130 is connected with the memory cell array 12 so as to transmit a command, an address, and data to the memory cell array 12 and to receive a processing result from the memory cell array 12.

Figure 3:
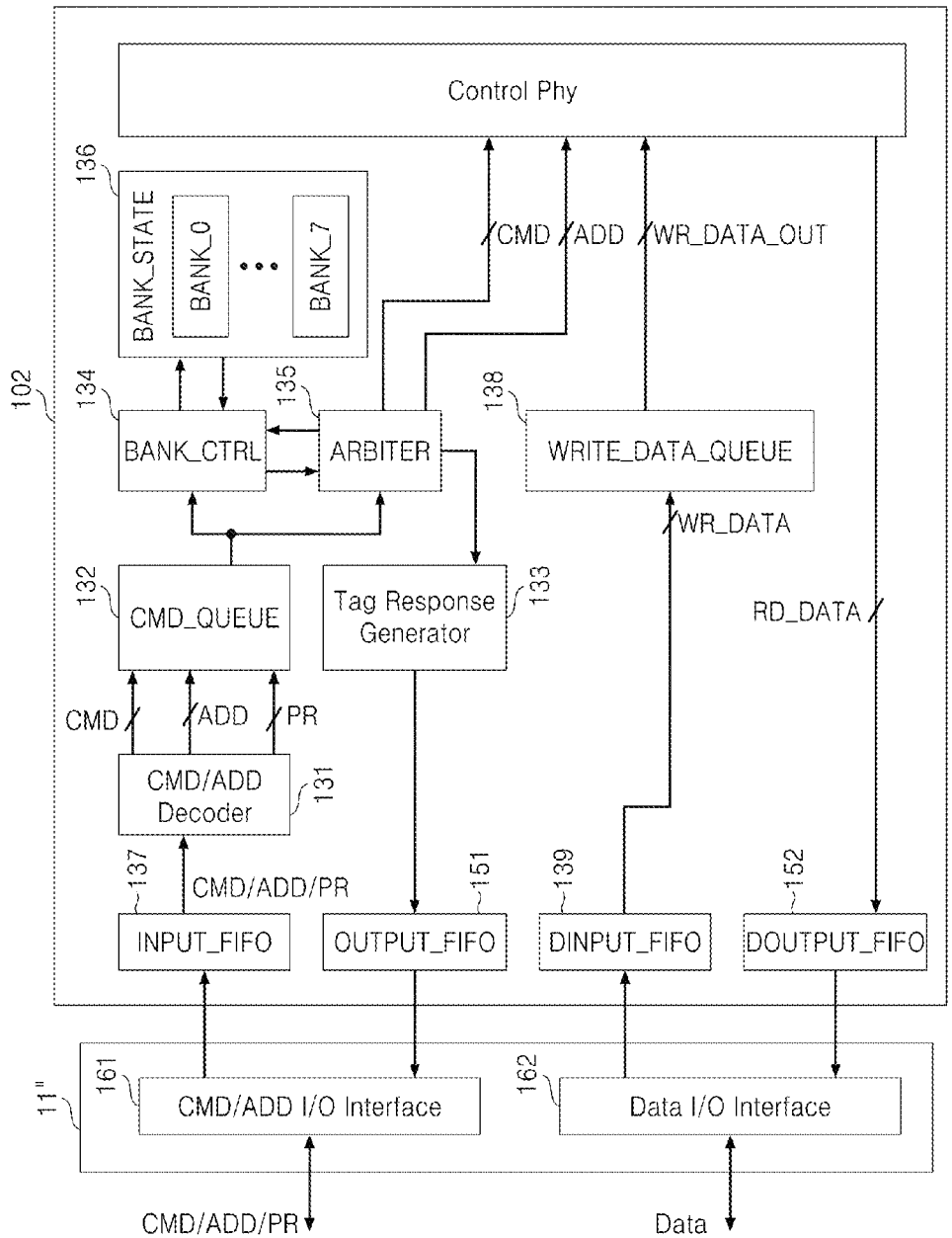
FIG. 3 is a detailed block diagram of another example of the memory device illustrated in FIG. 1, according to one embodiment.
Figure 4:
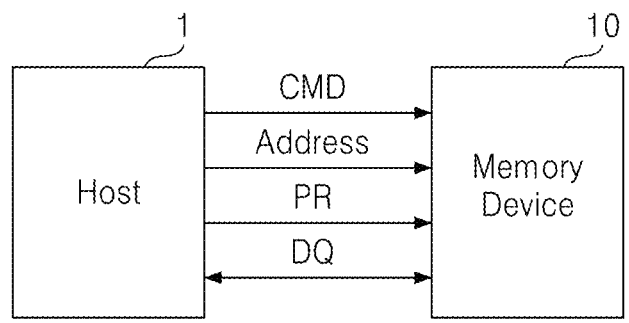
FIG. 4 is an exemplary diagram of the parallel transfer of data between the memory device and a host according to some embodiments.

FIG. 3 is a detailed block diagram of another example of the memory device 10 illustrated in FIG. 1, according to one embodiment. FIG. 4 is an exemplary diagram of the parallel transfer of data between the memory device 10 and the host 1 according to some embodiments.

Referring to FIGS. 3 and 4, the memory device 10 may communicate in parallel with the host 1. In detail, the host 1 and the memory device 10 may communicate with each other input information through a parallel port including separate pins respectively for a command CMD, an address ADD, data DQ, and a priority bit PR (e.g., for individually receiving bits from the host).

Referring to FIG. 3, a memory I/O interface 11" includes a command/address I/O interface 161 and a data I/O interface 162. The command/address I/O interface 161 receives a command, an address, and priority information in input information and transmits them to a control logic 102. The data I/O interface 162 receives write data WR_DATA in the input information and transmits it to the control logic 102 or outputs read data RD_DATA.

The control logic 102 may include a command/address decoder 131, a command queue 132, a write data queue 138, a bank controller 134, an arbiter 135, a bank state block 136, an input FIFO 137, and a data input FIFO 139.

The input FIFO 137 receives input information including a command, an address, and priority information in order in which they are output from the memory I/O interface 11". The command/address decoder 131 decodes the received input information. The input information is decomposed into a command CMD to be processed by the memory cell array 12, an address ADD associated with the memory cell array 12, and priority information regarding the execution sequence of the command CMD.

When the input information includes a write command CMD, a write address ADD, priority information, and write data WR_DATA, the write data queue 138 stores the write data WR_DATA. When the arbiter 135 outputs the write command CMD to the memory cell array 12 according to an execution sequence change based on the priority information, the write data queue 138 outputs the write data WR_DATA to the memory cell array 12. The command queue 132 receives the command CMD, the address ADD, and the priority information from the command/address decoder 131 and stores them.

The bank state block 136 stores a state of each of banks in the memory cell array 12. The bank controller 134 controls an access to the bank state block 136. The bank controller 134 reads a current state of a bank from the bank state block 136, informs the arbiter 135 of the state of the bank, and controls the bank state block 136 to store an update state of the bank when receiving the update state from the arbiter 135.

When the memory cell array 12 includes 8 banks, the arbiter 135 reads a current state of each of banks BANK0 through BANK7 in the memory cell array 12 from the bank state block 136 and considers it when setting the execution sequence of a command to be processed at an address corresponding to each bank. Also, when the arbiter 135 outputs a command to the memory cell array 12, it informs the bank controller 134 of the state of the bank that will be changed by the command so that state information of the bank is updated in the bank state block 136. Although the 8 banks BANK0 through BANK7 are illustrated in FIG. 3 for convenience' sake in the description, the disclosure is not restricted the current embodiments and the number of banks in the memory cell array 12 may be changed. The arbiter 135 changes the execution sequence of commands based on the priority information of commands CMD stored in the command queue 132 and the state of each bank so that commands having higher priority are executed earlier. At this time, the arbiter 135 may additionally generate a command CMD necessary when each of the commands in the command queue 132 is actually executed in the memory cell array 12 and the generated command CMD may be reflected to the changed execution sequence of each command. For instance, in DRAM, a pre-charge command may be additionally generated and reflected so that a bank is pre-charged after a CAS command. In addition, an active command may be additionally generated and reflected so that the bank is activated to allow a closed row including a DRAM cell to be accessed.

The control logic 102 may also include a tag response generator 133, an output FIFO 151, and a data output FIFO 152. Once the arbiter 135 outputs a command CMD and an address ADD to the memory cell array 12 according to a changed execution sequence, the tag response generator 133 generates a tag response and outputs it through the command/address I/O interface 161.

The output FIFO 151 outputs tag responses to the command/address I/O interface 161 in order in which they are generated by the tag response generator 133. When input information includes a read command, a read address, and priority information, the data output FIFO 152 receives data RD_DATA read from the memory cell array 12 in response to the read command and outputs it to the data I/O interface 162.

Figure 5:
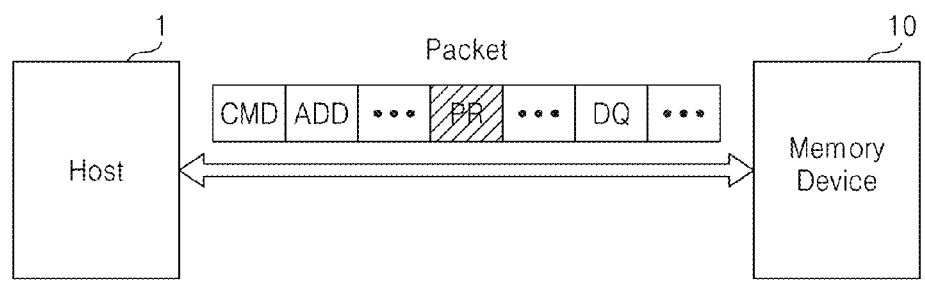
FIG. 5 is an exemplary diagram of the serial transfer of data between the memory device and the host according to some embodiments.

FIG. 5 is an exemplary diagram of the serial transfer of data between the memory device 10 and the host 1 according to some embodiments. Referring to FIG. 5, the memory device 10 may communicate in serial with the host 1. In other words, input information may be transferred in a packet including a command CMD, and address ADD, data DQ, and a priority bit PR through a serial port.

Figure 7:
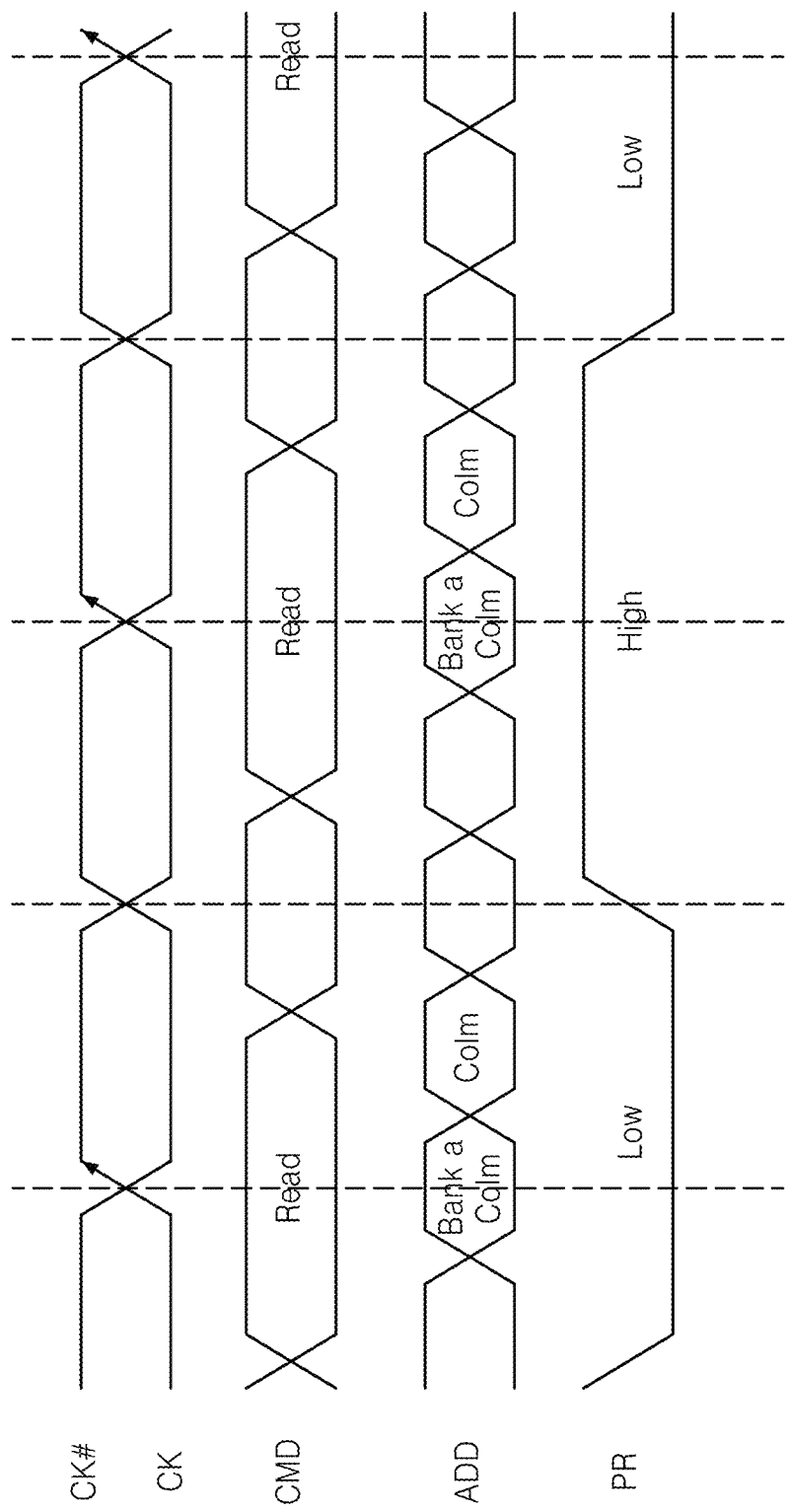
FIG. 7 is a signal timing chart showing data that the memory device illustrated in FIG. 6 receives from the host, according to one embodiment.

FIG. 6 is an exemplary diagram showing that the memory device 10 changes the execution sequence of a plurality of commands received from the host 1 according to some embodiments. FIG. 7 is a signal timing chart showing data that the memory device 10 illustrated in FIG. 6 receives from the host 1, according to one embodiment.

Referring to FIG. 6, the command queue 112 stores input information in order in which the input information is received through the input FIFO 117. The command queue 112 stores a decoded command CMD, an address ADD, and priority information together for the input information. In one embodiment, the priority information includes a priority bit indicating a processing sequence of a command, a data type, timeout count information indicating a processing time limit for the command, a page policy, or an algorithm control signal. The execution sequence of the command may be determined based on the priority bit, the data type, the timeout count, the page policy, or the algorithm control signal and a current state of a bank on which the command will be executed.

For instance, when the priority bit PR is used as priority information in a first table T1 and the memory device 10 receives input information read (a, m, n, low), write (b, k, l, low), write (a, m, p, low), read (b, k, q, low), read (a, s, t, low), read (a, s, v, low), read (b, y, z, low), and read (a, w, x, high); the control logic 100 sequentially stores commands, addresses, and priority information in the input information received from the host 1 in the command queue 112. The control logic 100 may generate and execute a command auxiliary necessary for a read or a write command to control the operation of the memory cell array 12. For instance, when the memory device 10 uses DRAM, the arbiter 115 may generate itself an active command and a pre-charge command for opening and closing a row to execute the read or write command.

The arbiter 115 changes the execution sequence of commands of the host 1 that are received from the command queue 112 and the active command and the pre-charge command that are generated by the arbiter 115 based on the priority information. Also, the arbiter 115 transmits the commands to the memory cell array 12 through the control PHY 130 according to the changed execution sequence of the commands to control the operation of the memory cell array 12.

According to a second table T2, the arbiter 115 may schedule the commands in order of active (a, w), active (b, k), read (a, w, x), read (b, k, q), write (b, k, l), pre-charge (a), pre-charge (b), active (a, m), active (b, y), read (a, m, n), read (b, y, z), write (a, m, p), pre-charge (a), pre-charge (b), active (a, s), read (a, s, t), read (a, s, v), and pre-charge (a) based on a priority bit for each command in the input information received from the host 1 and the commands generated by the arbiter 115 to control the operation of the memory cell array 12. For example, to operate adjacent cells in a bank, the arbiter 115 may change the execution sequence so that a command for which latency is important, that is, a command (e.g., read (a, w, x)) having a high priority bit is processed prior to commands having low priority bits.

Referring to FIG. 7, every time when a clock signal CK and an inverted clock signal CK# change, a read command CMD, an address ADD of data to be read, and a priority bit PR are transmitted from the input FIFO 117 to the control logic 100. At this time, the signals may be transmitted in series in a packet as shown in FIG. 5 or may be transmitted in parallel through respective pins as shown in FIG. 4.

The arbiter 115 considers at least one of the priority bit PR and the address ADD, i.e., a current state of a bank in information decoded by the packet decoder 111 when scheduling commands received from the host 1 and commands generated by the arbiter 115 itself so that commands having higher priority information are executed earlier than commands having lower priority information. In this case, the execution sequence may be changed depending on whether the bank is in an active state or a pre-charged state. The priority bit PR has one of two states, i.e., a low state and a high state in the current embodiments illustrated in FIG. 6, but the present disclosure is not restricted to the current embodiments. Priority information may be represented with multiple bits in other embodiments.

Figure 9:
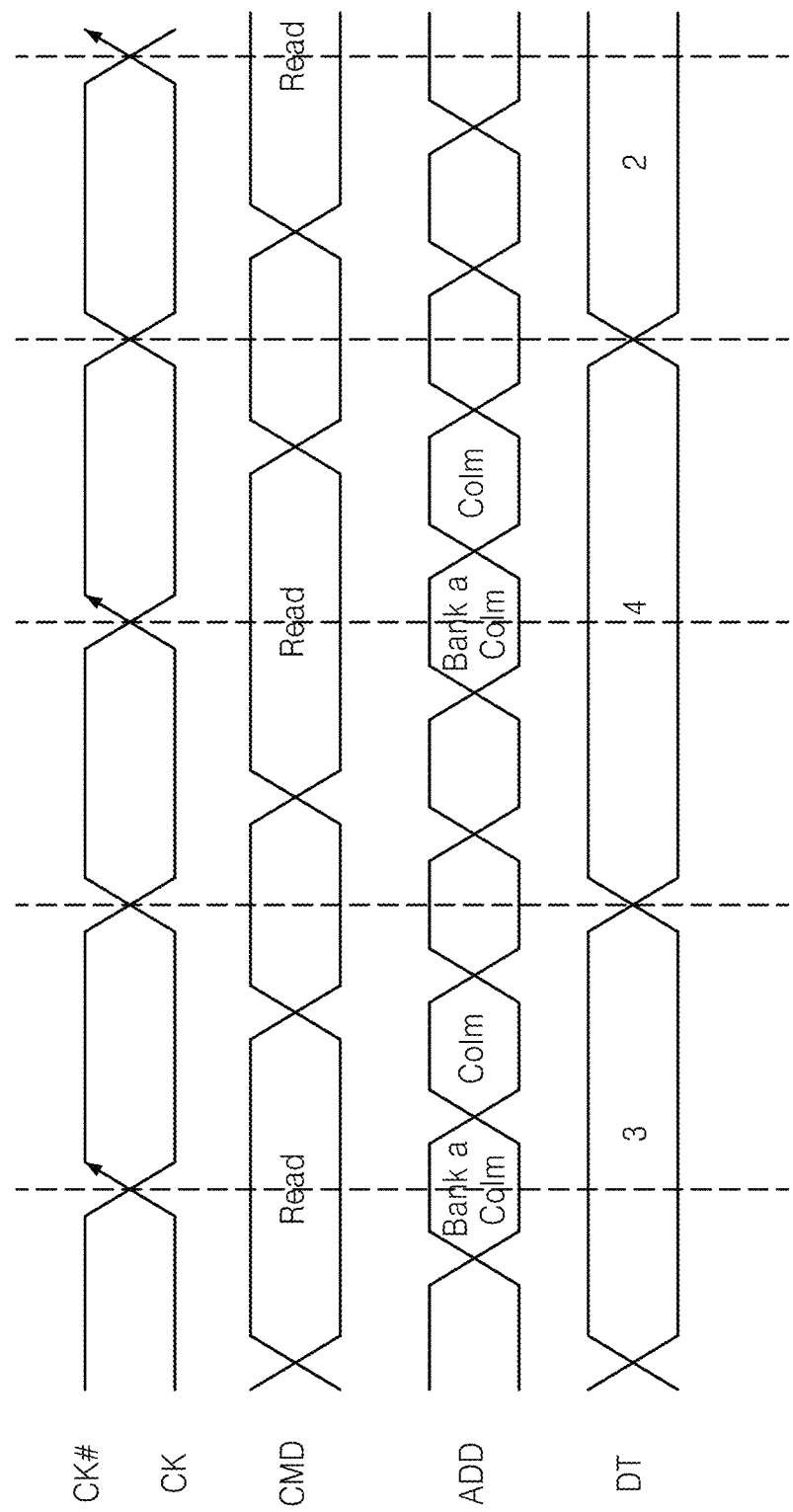
FIG. 9 is a signal timing chart showing data that the memory device illustrated in FIG. 8 receives from the host, according to one embodiment.

FIG. 8 is an exemplary diagram of a priority table used to schedule the execution of a plurality of commands that the memory device 10 receives from the host 1 according to some embodiments. FIG. 9 is a signal timing chart showing data that the memory device 10 illustrated in FIG. 8 receives from the host 1, according to one embodiment.

Referring to FIG. 8, the command queue 112 outputs commands, addresses, and priority information in order in which they are received from the host 1. At this time, unlike the embodiments illustrated in FIG. 6, the priority information may be transmitted in a form of a data type DT from the host 1.

The arbiter 115 may set the execution sequence according to a data type DT. Data may be sensitive to latency depending on its type, and therefore, the execution sequence may be set taking data type DT into account. For instance, when there are four data types DT, a priority of 4 is set for a first data type DT; a priority of 3 is set for a second data type DT; a priority of 2 is set for a third data type DT; and a priority of 1 is set for a fourth data type DT. The data type may be determined, for example, based on certain bits of the data.

Referring to FIG. 9, in one embodiment, every time when a clock signal CK and an inverted clock signal CK# change, input information including a read command CMD, an address ADD of data to be read, and data type DT from the host 1 is applied to the control logic 100. At this time, signals may be transmitted in series in a packet as shown in FIG. 5 or may be transmitted in parallel through respective pins as shown in FIG. 4. The arbiter 115 considers at least one of the data type DT and a current state of a bank detected based on the address ADD when scheduling commands received from the host 1 and commands generated by the arbiter 115 itself so that commands having a data type DT corresponding to a higher priority are executed earlier than commands having a data type DT corresponding to a lower priority. In this case, the execution sequence may be changed depending on whether the bank is in an active state or a pre-charged state.

Although it has been explained that there are four data types DT in the above embodiments, the present disclosure is not restricted thereto. There may be various numbers of data types DT in other embodiments.

Figure 11:
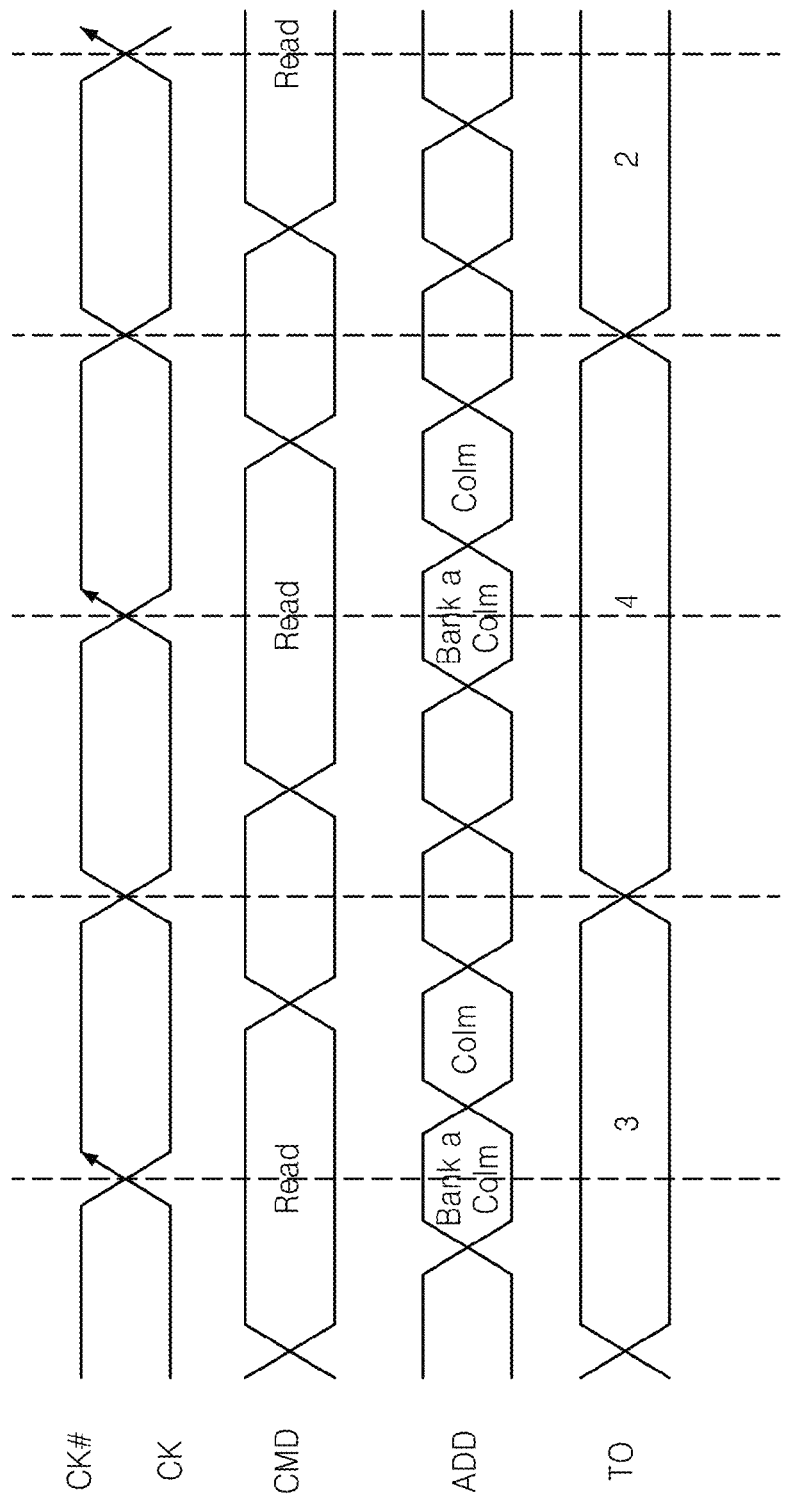
FIG. 11 is a signal timing chart showing data that the memory device illustrated in FIG. 10 receives from the host, according to one embodiment.

FIG. 10 is an exemplary diagram of a priority table used to schedule the execution of a plurality of commands that the memory device 10 receives from the host 1 according to other embodiments. FIG. 11 is a signal timing chart showing data that the memory device 10 illustrated in FIG. 10 receives from the host 1, according to one embodiment.

Referring to FIG. 10, input information may include timeout count information TO. The timeout count information indicates a maximum clock count within which input information must be executed. The clock count is increased from a time when the input information is received from the host 1. The clock count is a standby time of the input information in the control logic 100. For instance, when timeout count information TO is set to 1 for input information including a read command, the read command must be executed in the memory device 10 before the clock count exceeds a maximum timeout count of 5. When timeout count information TO is set to 2 for input information including a read command, the read command must be executed in the memory device 10 before the clock count exceeds a maximum timeout count of 20. In one embodiment, timeout count information TO may be represented in the form of one or more bits.

Referring to FIG. 11, the control logic 100 may receive a clock signal CK, a command CMD, an address ADD, and timeout count information TO from the host 1. The arbiter 115 may increase the priority of the execution sequence of a command when the command is not executed in the memory device even at a maximum clock count corresponding to the timeout count information TO. In one example, the arbiter may compare commands in terms of a difference between a current clock count and a maximum clock count regarding to the timeout count information TO and change the execution sequence so that commands having smaller differences between the current clock count and maximum clock count are executed earlier than commands having greater differences.

For instance, when the timeout count information TO of a read command is 4 and the read command has not been yet executed in the memory device 10 at a clock count close to a maximum clock count of 100, the arbiter 115 may change the execution sequence of the read command so that the read command is executed earlier than other commands that are standing by in the command queue 112 and have greater differences between a current clock count and a maximum clock count than the read command.

Figure 12:
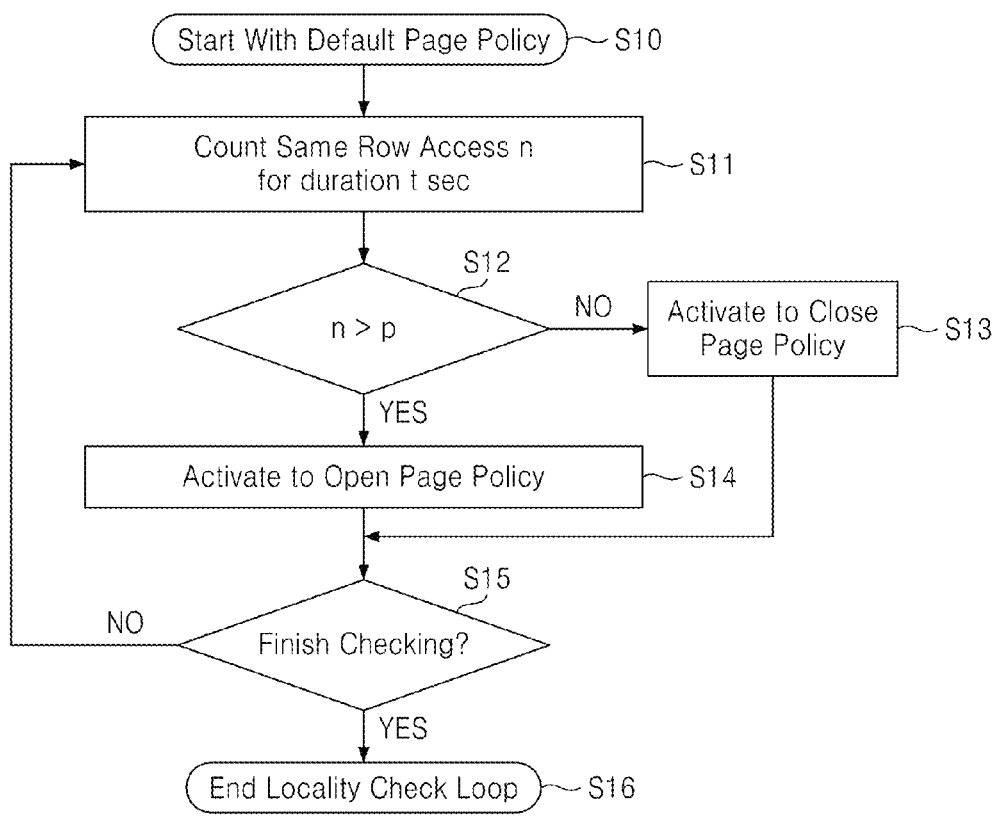
FIG. 12 is an exemplary flowchart of a method of deciding a page policy using a memory device according to some embodiments.
Figure 13:
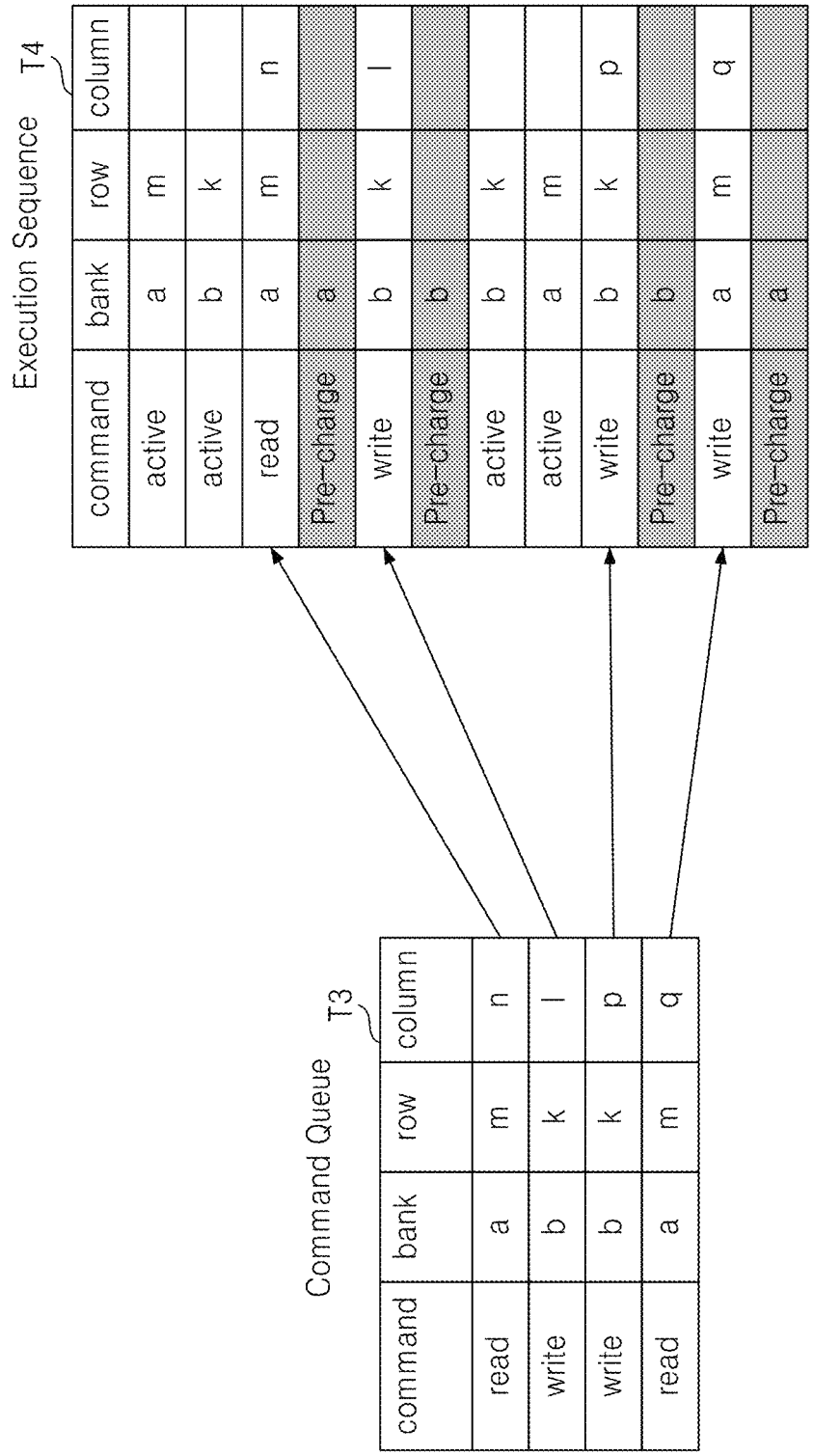
FIG. 13 is an exemplary diagram showing that the memory device illustrated in FIG. 12 schedules the execution of a plurality of commands according to a close page policy, according to one embodiment.
Figure 14:
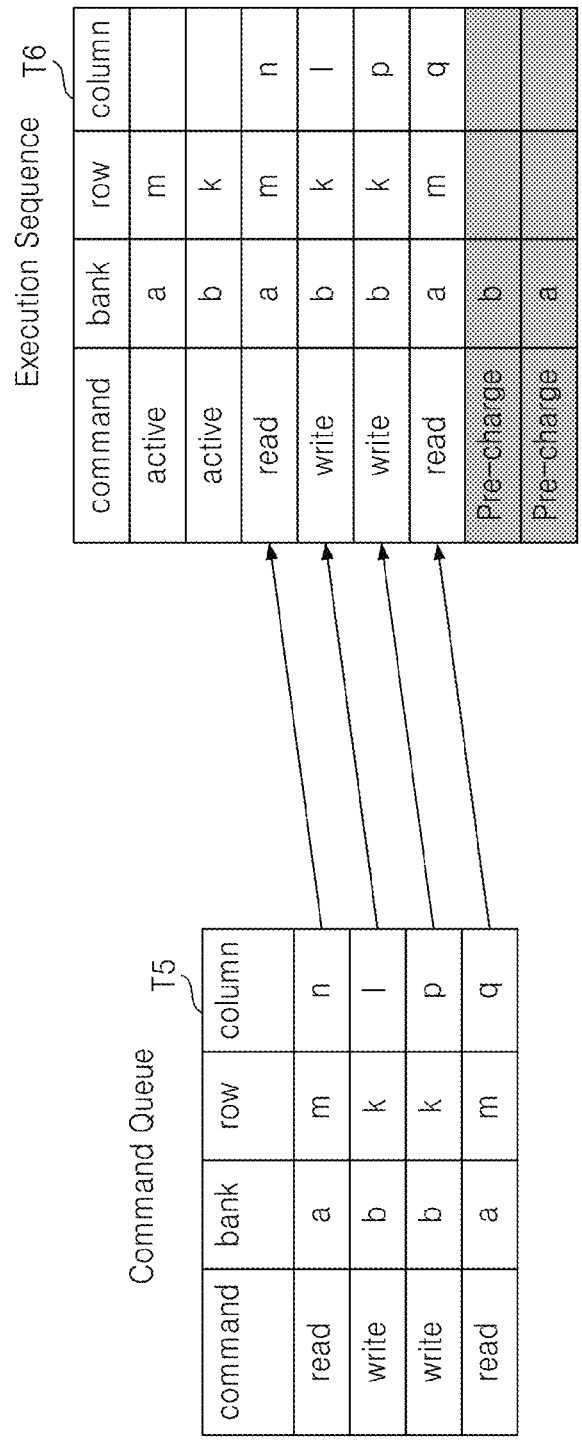
FIG. 14 is an exemplary diagram showing that the memory device illustrated in FIG. 12 schedules the execution of a plurality of commands according to an open page policy, according to one embodiment.

FIG. 12 is an exemplary flowchart of a method of deciding a page policy using a memory device according to some embodiments. FIG. 13 is an exemplary diagram showing that the memory device illustrated in FIG. 12 schedules the execution of a plurality of commands according to a close page policy, according to one embodiment. FIG. 14 is an exemplary diagram showing that the memory device illustrated in FIG. 12 schedules the execution of a plurality of commands according to an open page policy, according to one embodiment. Here, a memory cell may be a DRAM cell.

The control logic 100 may change a page policy according to the locality of a memory cell to be accessed when it accesses the memory cell array 12. For instance, in a case where a page is pre-charged right after only a single CAS command is executed, the page needs to be activated to immediately access a row in the page again, and therefore, latency and efficiency in current consumption are important issues. Accordingly, the open page policy or the close page policy is selectively executed according to the locality of a cell to be accessed.

Referring to FIG. 12, the control logic 100 is set to a default page policy in operation S10. The control logic 100 checks an address corresponding to a command from a host and counts the number "n" of accesses to a certain row for a predetermined duration "t" in operation S11. When the number "n" of accesses to the certain row, which is detected based on addresses in the command queue 112, is less than a predetermined value "p", the control logic 100 activates to the close page policy in operation S13. At this time, according to the close page policy, a page and a bank are pre-charged right after a command is executed and then they are activated when they are accessed afterwards.

When the number "n" of accesses to the certain row is greater than the predetermined value "p", the control logic 100 activates to the open page policy in operation S14. According to the open page policy, a page and a bank are not pre-charged immediately after the execution of a command but remain active so that a subsequent command can be executed continuously.

Referring to FIG. 13, under the close page policy, the control logic 100 receives a first read command "read (a, m, n)" from the host as shown in a third table T3. The control logic 100 activates a row "m" in a bank "a", in which a memory cell to be accessed is located, executes the read command, and then immediately pre-charges the bank "a" according to the execution sequence set by the arbiter 115 as shown in a fourth table T4. Thereafter, a first write command in the command queue 112 is executed on a bank "b" through the arbiter 115 after the bank "a" is closed and then the bank "b" is pre-charged.

Since the banks "a" and "b" have been pre-charged in the fourth table T4, the control logic 100 needs to activate a row "k" in the bank "b" when a memory cell in the row "k" and a column "p" in the bank "b" needs to be activated to execute a second write command in the command queue 112. As such, when a memory access frequency is low (i.e., when the number "n" of accesses to a certain row is less than the predetermined value "p"), the control logic 100 changes an execution sequence of commands according to the close page policy and executes the commands on the memory cell array 12 according to the changed execution sequence.

Referring to FIG. 14, under the open page policy, the control logic 100 receives the first read command "read (a, m, n)" from the host as shown in a fifth table T5. The control logic 100 activates the row "m" in the bank "a", in which a memory cell to be accessed is located, and executes the read command according to the execution sequence set by the arbiter 115 as shown in a sixth table T6. However, unlike the fourth table T4 shown in FIG. 13, the control logic 100 executes commands "write (b, k, l), write (b, k, p), and read (a, m, q) remaining in the command queue 112 without immediately pre-charging the bank "a".

In one embodiment, when the number "n" of accesses to a certain row of each bank is greater than the predetermined value "p", the locality of the memory cells is high, and therefore, a page or a bank once activated is maintained active until there is a CAS command for a different row in the bank or the predetermined duration "t" elapses. As a result, current consumption and latency required to activate the page can be reduced.

However, if a relevant page is maintained active when the locality is low (i.e., when the number "n" of accesses to a certain row is low), current consumption may be great, and therefore, the control logic 100 changes to the close page policy depending on the locality.

It has been explained that a page policy is changed depending on the locality of data in the above embodiments, but the present disclosure is not restricted thereto. Whether to select the close page policy illustrated in FIG. 13 or the open page policy illustrated in FIG. 14 may be determined based on a control based on a mode register setting from the host, a control based on a command from the host, a power state of the memory device, a memory access frequency, an operating frequency of the memory device, and/or the number of pages remaining in the command queue 112 in other embodiments.

A page policy may be changed to increase an execution speed depending on a type of an operation performed by a system. The page policy may be changed by changing a mode register set of the memory device 10 or transmitting a changing command of the page policy from the host 1 to the memory device 10.

The page policy may be changed while a memory device is not performing a read or write operation. While the memory device is not performing the read or write operation, standby current may be greater when a page is open than when the page is closed. The memory device may automatically change to the close page policy when the memory access frequency or the operating frequency is low. As a result, the power consumption of the memory device is reduced.

Figure 15:
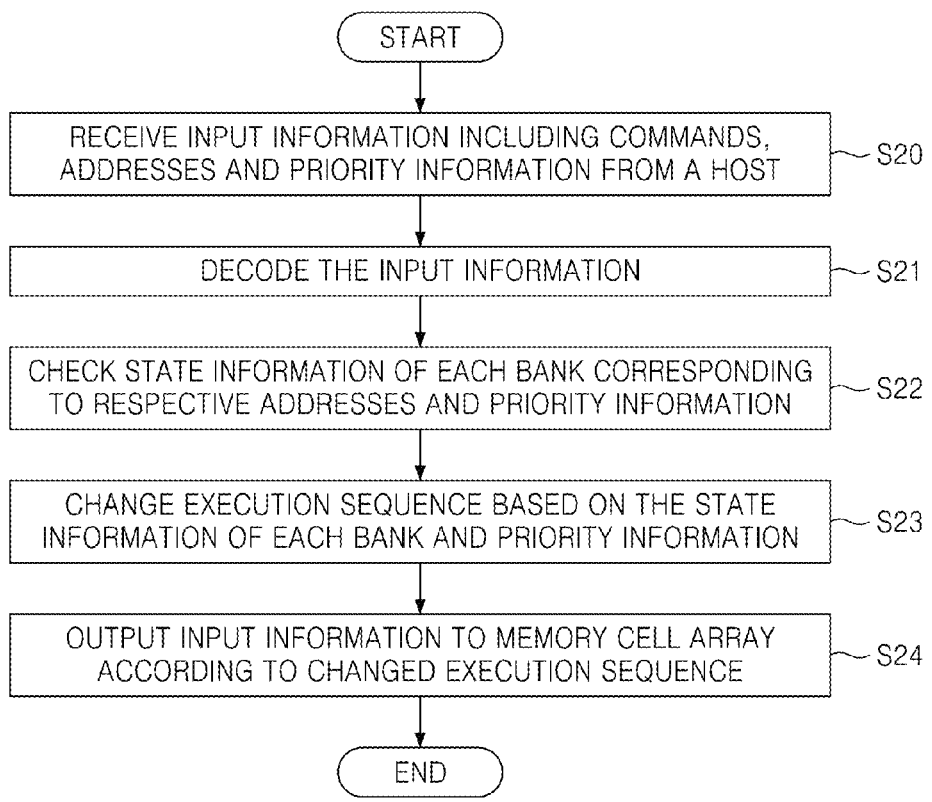
FIG. 15 is an exemplary flowchart of a method of operating a memory device according to some embodiments.

FIG. 15 is an exemplary flowchart of a method of operating the memory device 10 according to some embodiments. Referring to FIG. 15, the memory device 10 receives input information including commands, addresses, and priority information from a host in operation S20. The memory device 10 decodes the input information in operation S21. When one the commands is a write command, the input information may include write data.

The memory device 10 checks state information of each bank corresponding to respective addresses and the priority information in operation S22. The memory device 10 changes an execution sequence based on the state information of the each bank and the priority information in operation S23. In detail, a command having high priority information since it is sensitive to latency may be put earlier in the execution sequence and a command having low priority information may be put later in the execution sequence. In one embodiment, the priority information may be a priority bit indicating an execution sequence of the input information, a data type, timeout count information indicating a processing time limit for the input information, a page policy, or an algorithm control signal.

For instance, the memory device 10 may set the execution sequence of commands in a descending order of priority based on a type of data to be processed by a command. In another instance, the memory device 10 increases a clock count from a time when input information is received from the host for each command and when determining the execution sequence, it checks a current clock count for the command and compares the commands in terms of a difference between the current clock count and a maximum clock count regarding the timeout count information. The memory device 10 may change the execution sequence so that a command having a less difference is executed earlier than a command having a greater difference.

In another instance, the memory device 10 may set the execution sequence of commands in a descending order of priority based on a priority bit. In another instance, the memory device 10 sets the execution sequence of input information according to a default page policy, but when the number of consecutive accesses to a certain row, which is detected based on addresses, is lower than a predetermined value, the memory device 10 changes the execution sequence of commands corresponding to the addresses according to the close page policy. However, when the number of consecutive accesses to a certain row, which is detected based on addresses, is greater than the predetermined value, the memory device 10 changes the execution sequence of commands corresponding to the addresses according to the open page policy.

The memory device 10 outputs the commands, the addresses and data corresponding to the respective commands to the memory cell array 12 according to the changed execution sequence in operation S24. The memory cell array 12 executes each of the commands on a relevant memory cell according to the changed execution sequence. As a result, with improved latency, the operating speed of the memory device 10 increases and current consumption is decreased. Furthermore, deterioration of overall performance of a system can be prevented.

Figure 16:
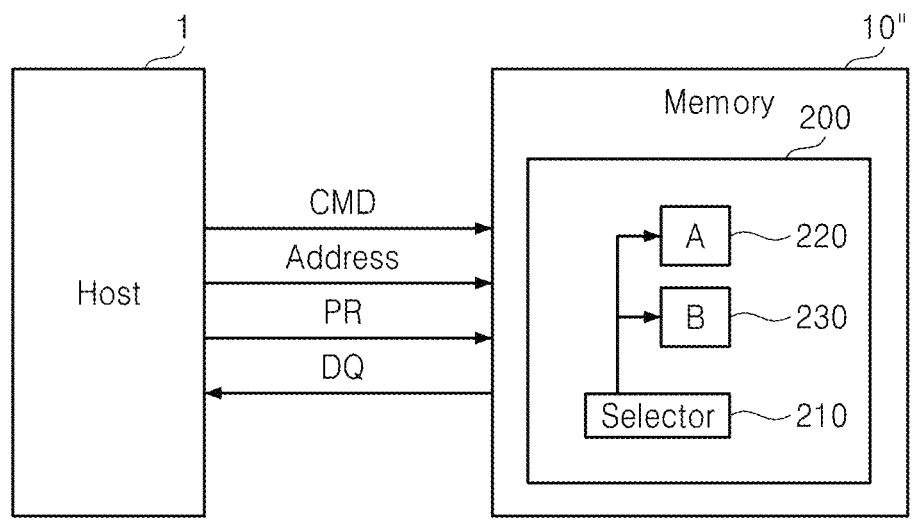
FIG. 16 is an exemplary diagram of a memory device including a plurality of algorithms according to some embodiments.

FIG. 16 is an exemplary diagram of a memory device 10″ including a plurality of algorithms according to some embodiments. Referring to FIG. 16, a control logic 200 may include at least two scheduling algorithm units 220 and 230 and a selector 210.

The selector 210 selects a priority bit indicating an execution sequence of the input information, a data type, timeout count information indicating a processing time limit for the input information, or a page policy.

Each of the scheduling algorithm units 220 and 230 changes the execution sequence of input information received from a host according to setting information regarding the priority bit, priority setting table information regarding the data type, timeout count setting information, or page policy setting information. The control logic 200 accesses the memory cell array 12 according to a selected algorithm.

As a result, the control logic 200 may change the execution sequence of commands CMD received from a host according to one of various algorithms as described with reference to FIGS. 1 through 14 and control the operation of the memory device 10″.

Figure 17:
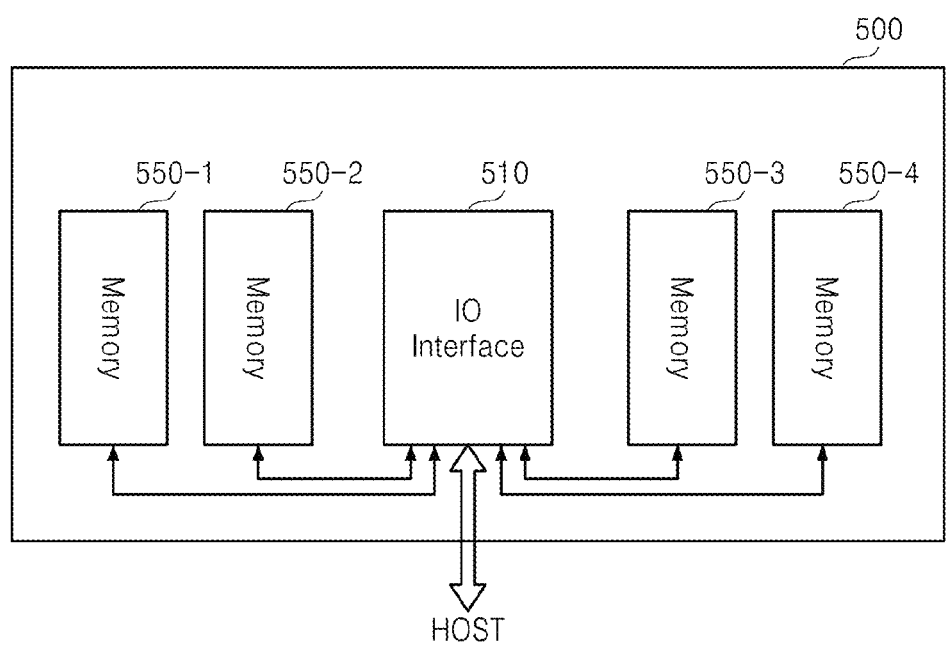
FIG. 17 is an exemplary block diagram of a module including a plurality of memory devices according to some embodiments.

FIG. 17 is an exemplary block diagram of a module 500 including a plurality of memory devices 550-1 through 550-4 according to some embodiments. Referring to FIG. 17, the module 500 may include an IO interface 510 and the memory devices 550-1 through 550-4. The IO interface 510 may be implemented separated from the memory devices 550-1 through 550-4 and may communicate with a host.

Figure 18:
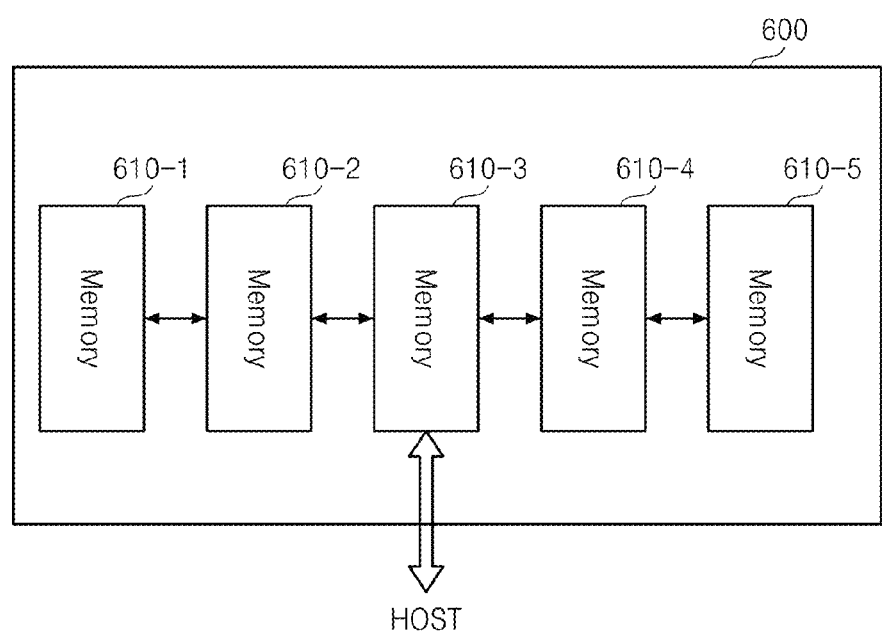
FIG. 18 is an exemplary block diagram of a module including a plurality of memory devices according to some embodiments.

FIG. 18 is an exemplary block diagram of a module 600 including a plurality of memory devices 610-1 through 610-5 according to some embodiments. Referring to FIG. 18, the module 600 may include the memory devices 610-1 through 610-5. One (e.g., 610-3) of the memory devices 610-1 through 610-5 may be directly connected to and communicate with a host. The memory devices 610-1 through 610-5 may be connected in a chain with one other.

The memory devices 610-1, 610-2, 610-4, and 610-5 that are not directly connected to the host may communicate with the host indirectly through the chain. A control logic controlling the operation of each of the memory devices 610-1 through 610-5 may be implemented within each memory device 610-1, 610-2, 610-3, 610-4, or 610-5.

Figure 19:
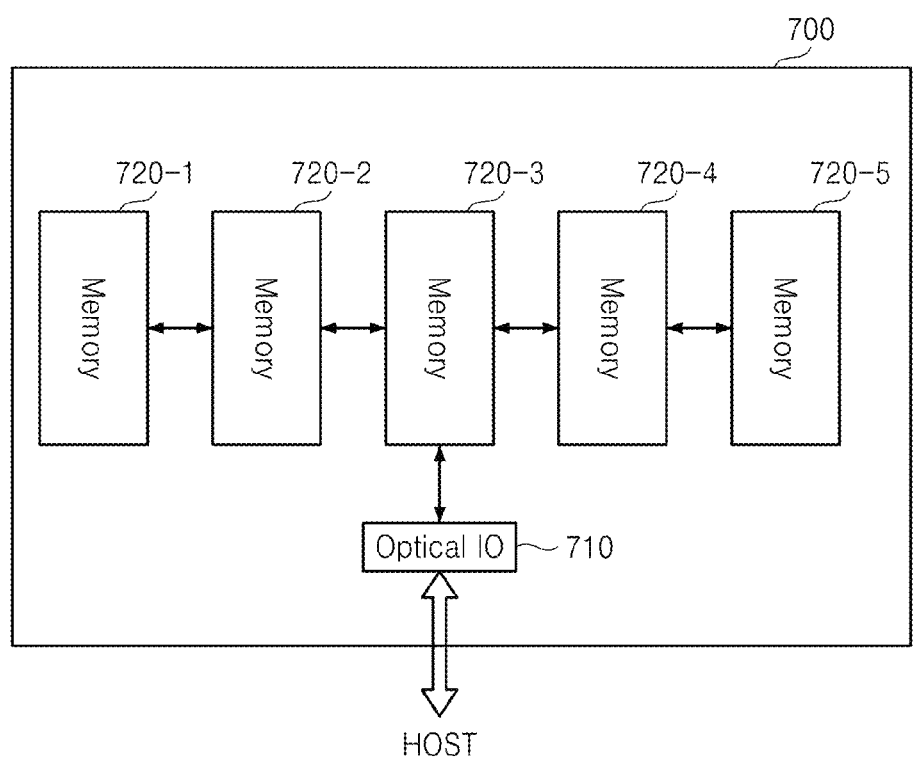
FIG. 19 is an exemplary block diagram of a module including a plurality of memory devices according to some embodiments.

FIG. 19 is an exemplary block diagram of a module 700 including a plurality of memory devices 720-1 through 720-5 according to some embodiments. Referring to FIG. 19, the module 700 may include a plurality of the memory devices 720-1 through 720-5 and an optical interface 710 performing interface for the data I/O of the memory devices 720-1 through 720-5.

The optical interface 710 may include an I/O controller (not shown) that controls an I/O operation of the memory devices 720-1 through 720-5 and a signal converter (not shown) that converts data input to or output from the memory devices 720-1 through 720-5 into an optical signal. The optical interface 710 provides data exchange between the memory devices 720-1 through 720-5 and the host using optical communication. The optical interface 710 may transfer data using optical fiber or waveguide. The exchanged data is suitable to a case where high-speed signals, such as signals complying with a serial advanced technology attachment (SATA) standard, are transmitted, or the data may be transmitted using wavelength division multiplexing.

A control logic that controls the operations of the memory devices 720-1 through 720-5 may be implemented in a stack structure within each of the memory devices 720-1 through 720-5.

Figure 20:
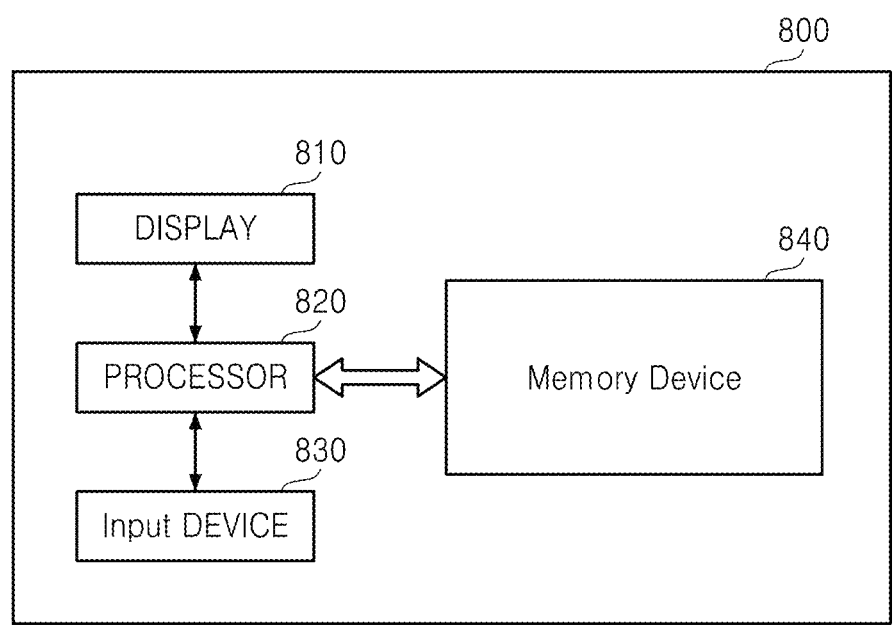
FIG. 20 is an exemplary block diagram of a data processing system including the memory device illustrated in FIG. 1 according to some embodiments.

FIG. 20 is an exemplary block diagram of a data processing system 800 including the memory device illustrated in FIG. 1 according to some embodiments. The data processing system 800 may be implemented as a personal computer (PC), a tablet PC, a net-book, an e-reader, a personal digital assistant (PDA), a portable multimedia player (PMP), an MP3 player, or an MP4 player.

The data processing system 800 includes the memory device 840. The memory device 840 includes a control logic controlling and scheduling the data processing operations of the memory device 840. A processor 820 may display data stored in the memory device 840 through a display 810 according to data input through an input device 830. The input device 830 may be implemented by a pointing device such as a touch pad, or a computer mouse, a keypad, or a keyboard.

The processor 820 may control the overall operation of the data processing system 800. The control logic, which may control the operations of the memory device 840, may be implemented as a part of the memory device 840 or in a stack structure within the memory device 840.

Figure 21:
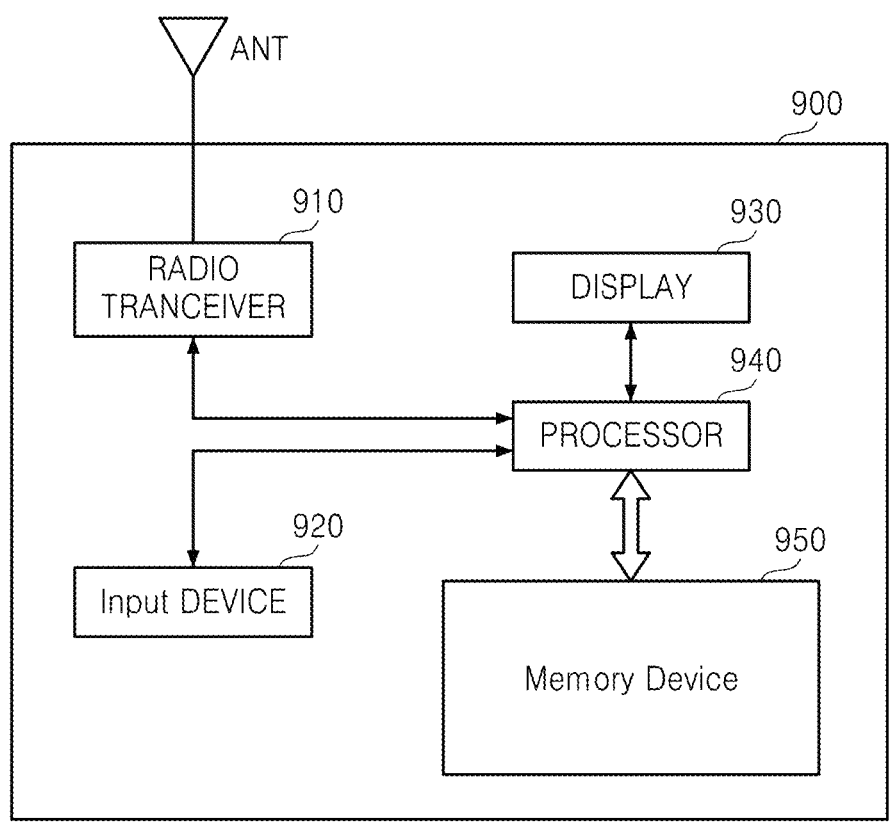
FIG. 21 is an exemplary block diagram of a data processing system including the memory device illustrated in FIG. 1 according to some embodiments.

FIG. 21 is an exemplary block diagram of a data processing system 900 including the memory device illustrated in FIG. 1 according to some embodiments. Referring to FIG. 21, the data processing system 900 may be implemented as a cellular phone, a smart phone, a personal digital assistant (PDA) or a radio communication system.

The data processing system 900 includes the memory device 950. The memory device 950 includes a control logic controlling and scheduling the data processing operations of the memory device 950. The control logic may control the data access operations, e.g., a program operation, an erase operation, and a read operation, of the memory device 950 according to the control of a processor 940.

The page data programmed in the memory device 950 may be displayed through a display 930 according to the control of the processor 940 and the control logic.

A radio transceiver 910 transmits or receives radio signals through an antenna ANT. The radio transceiver 910 may convert radio signals received through the antenna ANT into signals that can be processed by the processor 940. Accordingly, the processor 940 may process the signals output from the radio transceiver 910 and transmit the processed signals to the control logic or the display 930. The control logic may program the signals processed by the processor 940 to the memory device 950. The radio transceiver 910 may also convert signals output from the processor 940 into radio signals and outputs the radio signals to an external device through the antenna ANT.

An input device 920 enables control signals for controlling the operation of the processor 940 or data to be processed by the processor 940 to be input to the data processing system 900. The input device 920 may be implemented by a pointing device such as a touch pad or a computer mouse, a keypad, or a keyboard.

The processor 940 may control the operation of the display 930 to display data output from the control logic, data output from the radio transceiver 910, or data output from the input device 920. The control logic, which may control the operations of the memory device 950 and schedule the processing orders, may be implemented as a part of the processor 940 or in a stack structure within the memory device 950.

Figure 22:
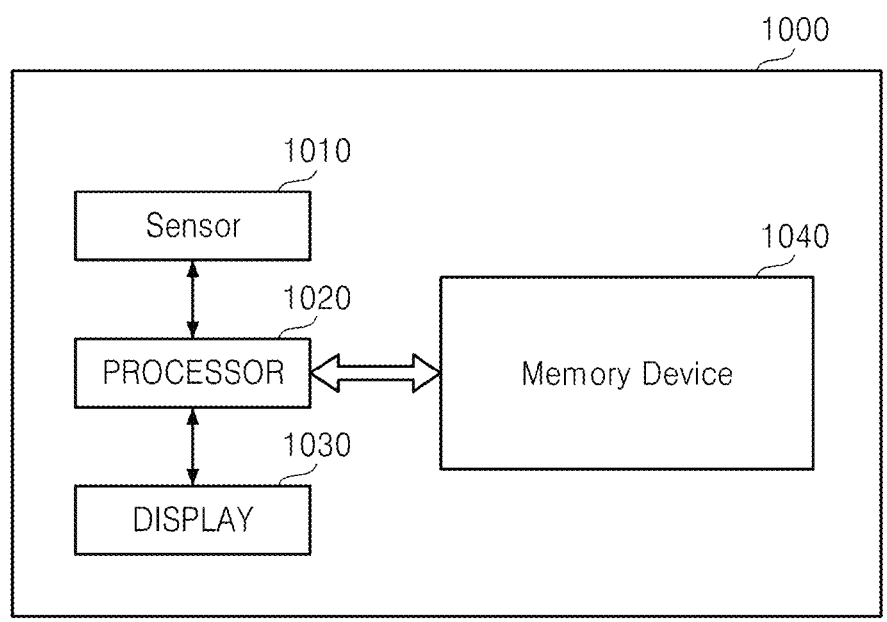
FIG. 22 is an exemplary block diagram of a data processing system including the memory device illustrated in FIG. 1 according to some embodiments.

FIG. 22 is an exemplary block diagram of a data processing system 1000 including the memory device illustrated in FIG. 1 according to some embodiments. Referring to FIG. 22, the data processing system 1000 may be implemented as an image processing device like a digital camera, a cellular phone equipped with a digital camera, a smart phone equipped with a digital camera, or a tablet PC equipped with a digital camera.

The data processing system 1000 includes the memory device 1040 having a control logic scheduling execution sequences of a program operation, an erase operation, and a read operation, of the memory device 1040.

A sensor 1010 included in the data processing system 1000 may be an image sensor, a motion sensor, or a voice sensor. The sensor 1010 converts multimedia images into digital signals and outputs the digital signals to a processor 1020 or the memory device 1040. The digital signals may be controlled by the processor 1020 to be displayed through a display 1030 or stored in the memory device 1040.

Data stored in the memory device 1040 may be displayed through the display 1030 according to the control of the processor 1010 or the control logic. The control logic may control the operations of the memory device 1040.

Figure 23:
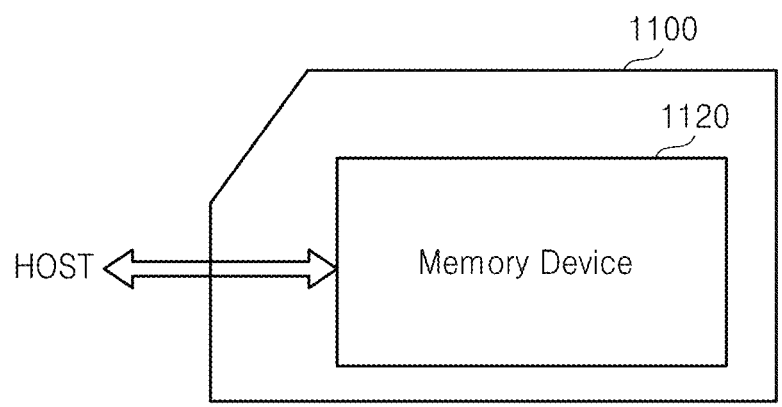
FIG. 23 is an exemplary block diagram of a data processing system 1100 including the memory device illustrated in FIG. 1 according to some embodiments.

FIG. 23 is an exemplary block diagram of a data processing system 1100 including the memory device illustrated in FIG. 1 according to some embodiments. The data processing system 1100 may be implemented as a memory card or a smart card. The data processing system 1100 includes the memory device 1120, and a card interface 1110.

The memory device 1120 may include a control logic scheduling execution sequences during data exchange between the memory device 1120 and the card interface 1110. The card interface 1110 may be a secure digital (SD) card interface or a multi-media card (MMC) interface, but the present disclosure is not restricted to the disclosed embodiments.

The card interface 1110 may interface a host and the memory device 1120 for data exchange according to a protocol of the host. The card interface 1110 may support a universal serial bus (USB) protocol and an interchip (IC)-USB protocol. Here, the card interface may indicate hardware supporting a protocol used by the host, software installed in the hardware, or a signal transmission mode.

When the memory system 1100 is connected with the host such as a PC, a tablet PC, a digital camera, a digital audio player, a cellular phone, a console video game hardware, or a digital set-top box, the host 1 may perform data communication with the memory device 200 through the card interface 1110.

Figure 24:
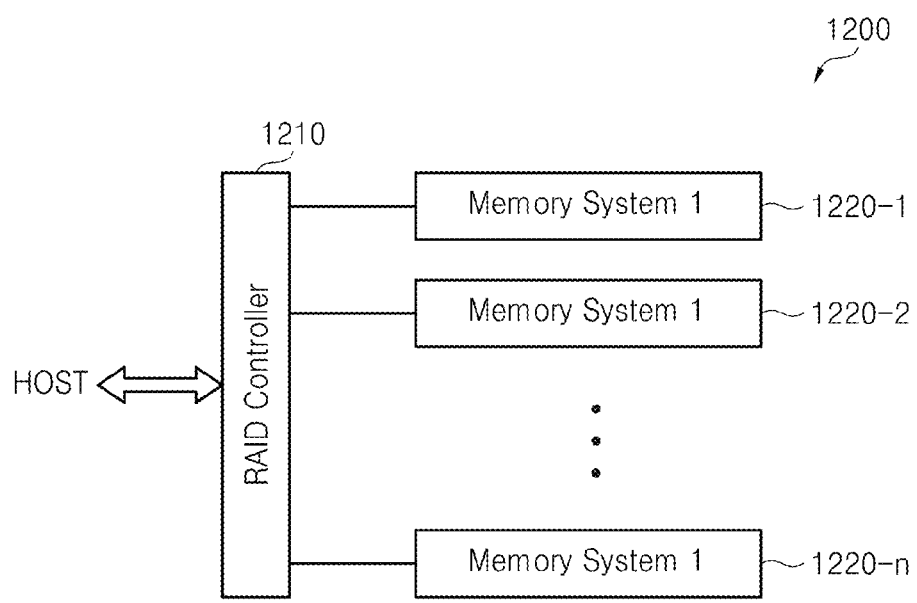
FIG. 24 is an exemplary block diagram of a data storage device 1200 including the memory device illustrated in FIG. 1 according to some embodiments.

FIG. 24 is an exemplary block diagram of a data storage device 1200 including the memory device illustrated in FIG. 1 according to some embodiments. Referring to FIG. 24, the data storage device 1200 may be implemented as a redundant array of independent disks (RAID) system. The data storage device 1200 includes a RAID controller 1210 and a plurality of memory modules 1220-1 through 1220-*n* where "n" is a natural number.

Each of the plurality of memory modules 1220-1 through 1220-*n* may be the data processing system 1100 illustrated in FIG. 23. The plurality of memory modules 1220-1 through 1220-*n* may form a RAID array.

Each of the memory modules 1220-1 through 1220-*n* includes a control logic scheduling execution sequences of the data processing operations, such as a program operation, an erase operation, and a read operation, of the memory modules 1220-1 through 1220-*n*.

The data storage device 1200 may be implemented as a personal computer (PC) or a solid state drive (SSD).

During a program operation, the RAID controller 1210 may transmit program data output from a host to at least one of the memory modules 1220-1 through 1220-*n* according to a RAID level in response to a program command received from the host. During a read operation, the RAID controller 1210 may transmit to the host data read from at least one of the memory modules 1220-1 through 1220-*n* in response to a read command received from the host.

Figure 25:
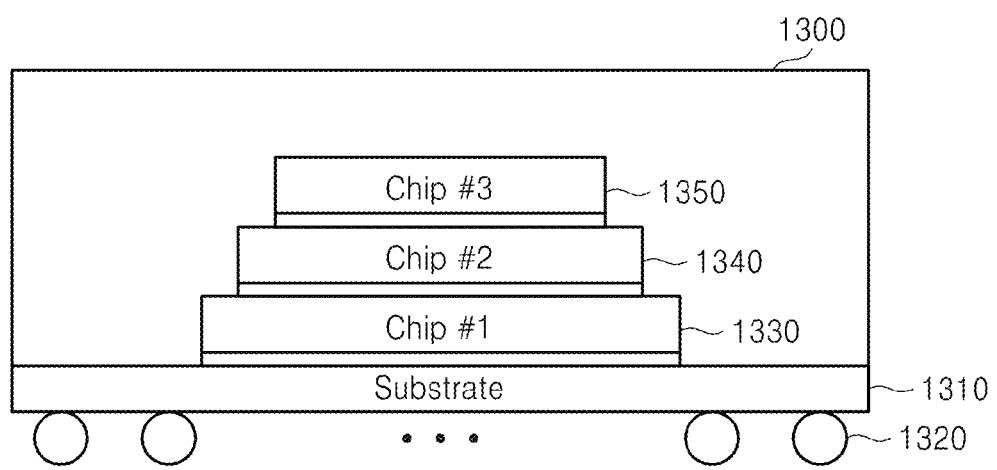
FIG. 25 is an exemplary schematic diagram of a multi-chip package including the memory device illustrated in FIG. 1 according to some embodiments.

FIG. 25 is an exemplary schematic diagram of a multi-chip package 1300 including the memory device 10 illustrated in FIG. 1 according to some embodiments. Referring to FIG. 25, the multi-chip package 1300 may include a plurality of semiconductor devices, i.e., first through third chips 1330, 1340, and 1350 which are sequentially stacked on a package substrate 1310. Each of the semiconductor devices 1330 through 1350 may be the memory device 10 illustrated in FIG. 1. The memory device 10 may be a volatile or non-volatile memory device. A control logic according to some embodiments of the present disclosure may be included within at least one of the semiconductor devices 1330 through 1350 or may be implemented on the package substrate 1310. A through-substrate via (e.g., through-silicon via, TSV) (not shown), a bonding wire (not shown), a bump (not shown), or a solder ball 1320 may be used to electrically connect the semiconductor devices 1330 through 1350 with one other.

For instance, as shown in FIG. 17, the first semiconductor device 1330 may be a logic die including an I/O interface and a control logic and each of the second and third semiconductor devices 1340 and 1350 may be a die, on which a plurality of memory devices are stacked, and may include a memory cell array. At this time, the second semiconductor device 1340 and the third semiconductor device 1350 may be the same or different type of memory devices.

In another instance, as shown in FIG. 18, each of the first through third semiconductor devices 1330 through 1350 may include a control logic. At this time, the control logic may be on the same die or on a different die than the memory cell array.

In another instance, as shown in FIG. 19, the first semiconductor device 1330 may include an optical interface. A control logic may be positioned in the first or second semiconductor device 1330 or 1340. A memory device may be positioned in the second or third semiconductor device 1340 or 1350 to be connected with the control logic through a TSV.

The multi-chip package 1300 may be implemented in a structure in which a plurality of memory cell array dies are stacked. When such stack structure is used, the performance of memory devices increases due to the increase of bandwidth and the area of the memory devices is minimized. As a result, power consumption and manufacturing cost can be reduced.

Figure 26:
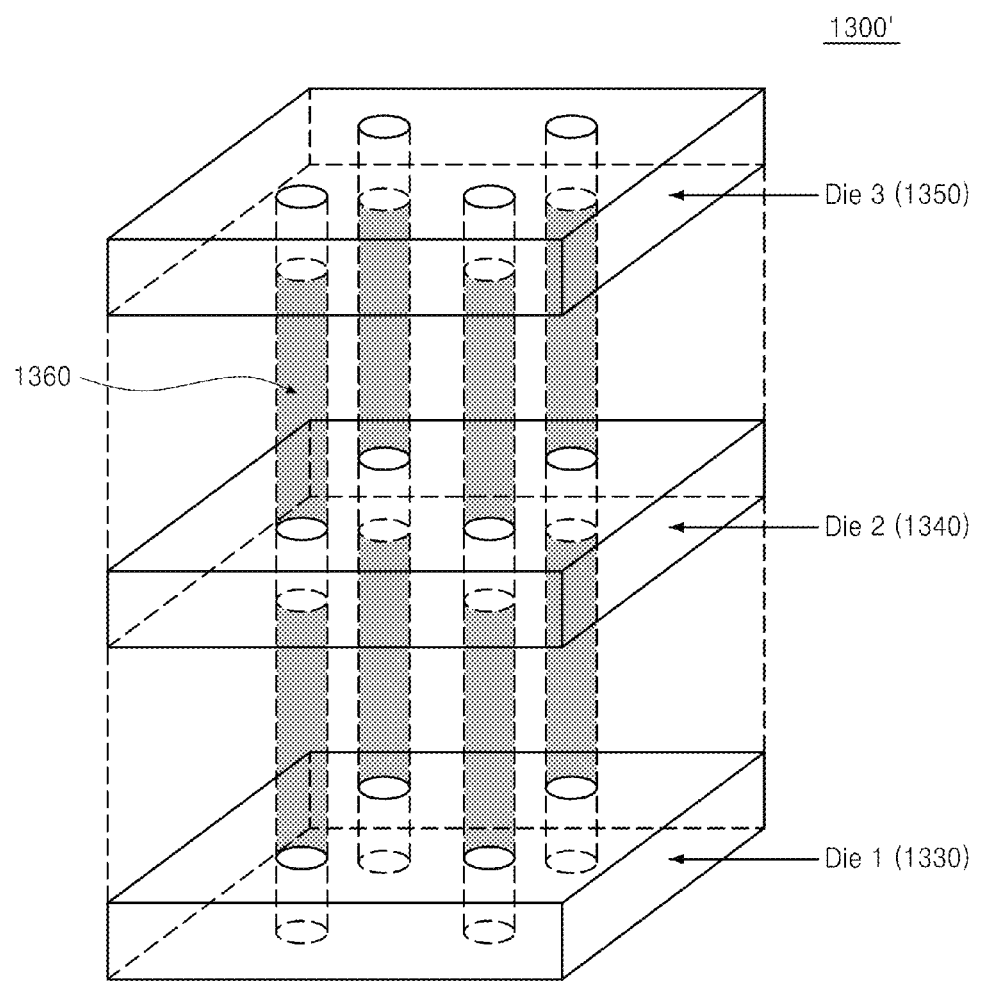
FIG. 26 is an exemplary three-dimensional diagram of the multi-chip package illustrated in FIG. 25, according to some embodiments.

FIG. 26 is an exemplary three-dimensional diagram of an example 1300' of the multi-chip package 1300 illustrated in FIG. 25, according to some embodiments. Referring to FIG. 26, the multi-chip package 1300' includes a plurality of the dies 1330 through 1350 connected with one another through TSVs 1360 in a stack structure. Each of the dies 1330 through 1350 may include a plurality of circuit blocks (not shown) and a periphery circuit to realize the functions of the memory device 10. A semiconductor memory device including a memory cell array may be used as the memory device 10. When the memory device 10 illustrated in FIG. 1 is the semiconductor memory device, the dies 1330 through 1350 may be referred to as a cell array. The plurality of circuit blocks may be implemented by memory blocks.

The TSVs 1360 may be formed of a conductive material including a metal such as copper (Cu). The TSVs 1360 are arranged at the center of a substrate (e.g., silicon). The substrate surrounds the TSVs 1360. An insulating region (not shown) may be disposed between the TSVs 1360 and the substrate.

Figure 27:
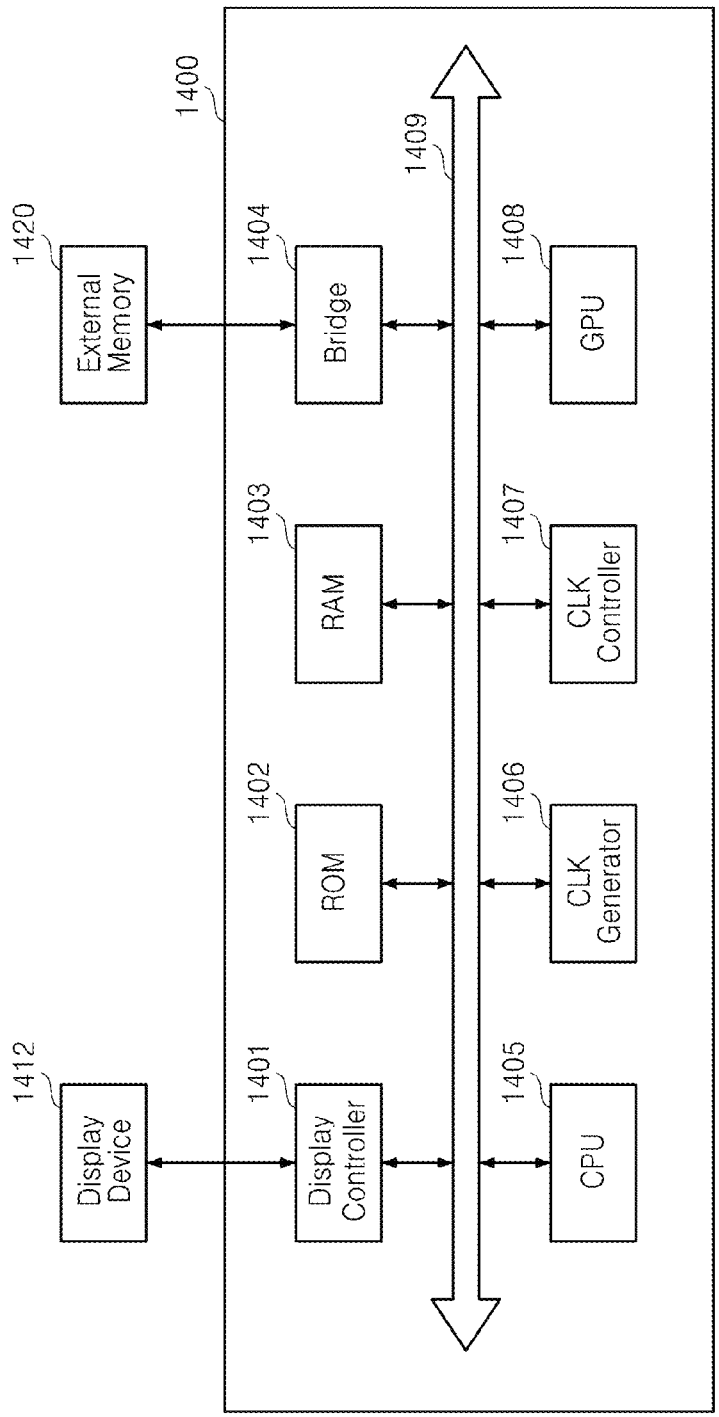
FIG. 27 is an exemplary block diagram of a memory device according to some embodiments.

FIG. 27 is an exemplary block diagram of a memory device according to some embodiments. Referring to FIG. 27, a semiconductor system may be implemented as a handheld device such as a mobile telephone, a smart phone, a tablet computer, a personal digital assistant (PDA), an enterprise digital assistant (EDA), a digital still camera, a digital video camera, a portable multimedia player (PMP), a personal navigation device or portable navigation device (PND), a handheld game console, or an e-book. The semiconductor system may include a system-on-chip (SoC) 1400, an external memory 1420, and a display device 1412.

The SoC 1400 may include a display controller 1401, a read-only memory (ROM) 1402, a random access memory (RAM) 1403, a bridge 1404, a CPU 1405, a clock generator 1406, a clock controller 1407, a GPU 1408, and a bus 1409. The SoC 1400 may also include other elements, e.g., a power management unit and a television (TV) processor.

The CPU 1405 may process or execute programs and/or data stored in the memory 1404 or 1420. For instance, the CPU 1405 may process or execute the programs and/or the data in response to an operating clock signal output from the clock generator 1406.

The CPU 1405 may be implemented by a multi-core processor. The multi-core processor is a single computing component with two or more independent actual processors (referred to as cores). Each of the processors may read and execute program instructions. The multi-core processor can drive a plurality of accelerators at a time, and therefore, a data processing system including the multi-core processor may perform multi-acceleration.

The programs and/or the data stored in the external memory 1420 may be loaded to a memory in the CPU 1405 when necessary.

The ROM 1402 may store permanent programs and/or data. The ROM 1402 may be implemented by erasable programmable ROM (EPROM) or electrically erasable programmable ROM (EEPROM).

The RAM 1403 may temporarily store programs, data, or instructions. The programs and/or data stored in the external memory 1420 may be temporarily stored in the RAM 1403 according to the control of the CPU 1405 or a booting code stored in the ROM 1402. The RAM 1403 may be implemented by dynamic RAM (DRAM) or static RAM (SRAM).

The bridge 1404 is used for interface between the external memory 1420 and the bus 1409. The bridge 1404 controls the overall data exchange between the semiconductor system 1400 (i.e., a host) and the external memory 1420. The bridge 1404 transmits input information of the SoC 1400 to the external memory 1420, so that data is written to or read from the external memory 1420 according to the input information from the SoC 1400. The SoC 1400 may have a master device such as the CPU 1405, the GPU 1408, or the display controller 1401.

The external memory 1420 is a storage for storing data and may store an operating system (OS) and various kinds of programs and data. The external memory 1420 may be implemented by DRAM, but the inventive concept is not restricted to the current embodiments. The external memory 1420 may be implemented by non-volatile memory such as flash memory, phase-change RAM (PRAM), magnetoresistive RAM (MRAM), resistive RAM (ReRAM) or ferroelectric RAM (FeRAM). In other embodiments, the external memory 1420 may be embedded in the SoC 1400.

The elements of the SoC 1400 may communicate with one another through the bus 1409.

The display device 1412 may display multimedia loaded to the display controller 1401. The display device 1412 may be a liquid crystal display (LCD) device, a light emitting diode (LED) display device, an organic LED (OLED) display device, or any of other types of display devices.

The display controller 1401 controls the operations of the display device 1412.

The present disclosure can also be embodied as computer-readable codes on a computer-readable medium. The computer-readable recording medium is any data storage device that can store data as a program which can be thereafter read by a computer system. Examples of the computer-readable recording medium may include a read-only memory (ROM), a random-access memory (RAM), CD-ROMs, magnetic tapes, floppy disks, or optical data storage devices.

The computer-readable recording medium can also be distributed over network coupled computer systems so that the computer-readable code is stored and executed in a distributed fashion. Also, functional programs, codes, and code segments to accomplish the present disclosure can be easily construed by programmers.

As described above, according to some embodiments, a memory device receives priority information from a host and processes commands according to the priority information, thereby increasing an operating speed and preventing the overall performance of a system from deteriorating.

While the present disclosure has been particularly shown and described with reference to exemplary embodiments thereof, it will be understood by those of ordinary skill in the art that various changes in forms and details may be made therein without departing from the spirit and scope of the present disclosure as defined by the following claims.

What is claimed is:

1. A memory device comprising:
    a control logic configured to receive input information including a plurality of commands, a plurality of addresses, and priority information, and to change an execution sequence of the received commands of the input information according to the priority information; and
    a memory cell array including a plurality of memory cells, the memory device configured to perform an operation on one or more memory cells based on the changed execution sequence,
    wherein the priority information includes timeout count information indicating a maximum clock count within which a corresponding command is to be executed.

2. The memory device of claim 1, wherein the control logic comprises:
    a packet decoder configured to decode the input information received in a packet into the commands, the addresses, and the priority information;
    a command queue configured to store the commands, the addresses, and the priority information; and
    an arbiter configured to change the execution sequence of the commands according to the priority information and to transmit the commands and the addresses to the memory cell array based on the changed execution sequence.

3. The memory device of claim 2, wherein the control logic further comprises:
    a bank state block configured to store a state of a bank defined in the memory cell array; and
    a bank controller configured to read or update the state of the bank, which is stored in the bank state block, upon receiving a corresponding command and a corresponding address.

4. The memory device of claim 3, wherein the control logic further comprises a write data queue configured to store write data and to output the write data to the memory cell array when a write command is output to the memory cell array.

5. The memory device of claim 4, wherein the control logic further comprises a packet generator configured to receive data read from the memory cell array, and output the received data in a packet.

6. The memory device of claim 1, further comprising:
    a first input/output interface configured to receive the commands, the addresses, and the priority information through a first port and to transmit them to the control logic; and
    a second interface configured to receive write data through a second port, to transmit it to the control logic, and to output data read from the memory cell array.

7. The memory device of claim 6, wherein the control logic comprises:
    a command/address decoder configured to decode the commands, the addresses, and the priority information received from the first input/output interface;
    a command queue configured to store the commands, the addresses, and the priority information that have been decoded;
    a bank state block configured to store a state of a bank defined in the memory cell array;
    a bank controller configured to read or update the state of the bank, which is stored in the bank state block, upon receiving the commands and the addresses from the command queue;
    an arbiter configured to change the execution sequence of the commands according to the priority information and to transmit the commands and the addresses to the memory cell array based on the changed execution sequence and the state of the bank; and
    a tag response generator configured to generate a tag response when the arbiter transmits the commands and the addresses to the memory cell array and to output the tag response signal to the first input/output interface.

8. The memory device of claim 7, wherein the control logic further comprises a write data queue configured to store write data from the second interface and to output the write data to the memory cell array when a write command is output to the memory cell array.

9. The memory device of claim 1, wherein the control logic is configured to compare a plurality of items of the received commands with each other in terms of a difference between a current clock count and the timeout count, and change the execution sequence so that an item of the received commands having a less difference is executed earlier than an item of the received commands having a greater difference.

10. The memory device of claim 1, wherein the priority information includes a priority indicator including timeout count information.

11. The memory device of claim 10, wherein the priority indicator is received in either packet type data or individually received bits.

12. The memory device of claim 1, wherein the control logic is configured to, when the number of addresses consecutively belonging to one row of memory cells in the memory cell array does not exceed a predetermined value, change the execution sequence of commands, which respectively corresponds to addresses decoded from the input information, according to a close page policy; and
    the control logic is configured to, when the number of addresses consecutively belonging to one row exceeds the predetermined value, change the execution sequence of the commands according to an open page policy.

13. A memory system comprising:
    a memory device of claim 1; and
    a host electrically connected to the memory device, the host configured to generate and output the input information.

14. A method for operating a memory device including a memory cell array having a plurality of memory cells, the method comprising:
    receiving, from a host, input information comprising a plurality of commands, a plurality of addresses, data associated with the commands and addresses, and priority information indicating an execution sequence of the commands;
    changing the execution sequence of the commands based on the priority information and state information of a bank of the memory cell array corresponding to the addresses; and
    outputting the commands and the addresses to the memory cell array according to the changed execution sequence,
    wherein the priority information comprises a priority indicator indicating timeout count information indicating a processing time limit for the commands, or a page policy.

15. A memory device comprising:
- a command queue configured to store input information including a plurality of commands, a plurality of addresses associated with the commands, and priority information associated with the commands;
- an arbiter configured to monitor the stored commands of the command queue, and to change an execution sequence of the stored commands in response to the priority information; and
- a memory cell array including a plurality of memory cells, wherein the memory device is configured to perform an operation on the memory cells based on the changed execution sequence,
- wherein the priority information includes a priority indicator including timeout count information indicating a maximum clock count within which a corresponding command is to be executed.

16. The memory device of claim 15, wherein the priority information is information received from outside the memory device.

17. The memory device of claim 15, wherein the priority indicator is received in either packet type data or individually received bits.

18. The memory device of claim 15, wherein the command queue is configured to receive, for each command, respective priority information corresponding to the command.

* * * * *